(12) United States Patent
Miki et al.

(10) Patent No.: US 6,728,495 B1
(45) Date of Patent: Apr. 27, 2004

(54) LIGHT OUTPUT CONTROL CIRCUIT WITH A WARNING FUNCTION OF DETERIORATED LIGHT OUTPUT

(75) Inventors: Makoto Miki, Sapporo (JP); Norio Murakami, Sapporo (JP); Toshiyuki Takauji, Sapporo (JP); Toru Matsuyama, Sapporo (JP); Tadashi Ikeuchi, Kawasaki (JP); Tadao Inoue, Kawasaki (JP); Norio Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/521,447

(22) Filed: Mar. 7, 2000

(30) Foreign Application Priority Data

Mar. 19, 1999 (JP) ............................................. 11-076185

(51) Int. Cl.[7] .......................... H04B 10/04; H04B 10/08
(52) U.S. Cl. ......................................... 398/197; 398/23
(58) Field of Search .................................. 359/180, 187, 359/137; 398/197, 23

(56) References Cited

U.S. PATENT DOCUMENTS 6,188,498 B1 * 2/2001 Link et al. .................. 359/187

FOREIGN PATENT DOCUMENTS

JP      6-61945     4/1994
JP      6-97547     8/1994

OTHER PUBLICATIONS

E. Säckinger et al., "15mW, 155Mb/s CMOS Burst–Mode Laser Driver with Automated Power Control and End–of–Life Detection", 1999 IEEE International Solid–State Circuits Conference, Feb. 1999.*

M. Nakamura et al., "1.2V, 35mW CMOS Optical Transceiver ICs for 50Mbit/s Burst–Mode Communication", Electronics Letters, vol. 35, No. 5, Mar. 4th 1999.*

* cited by examiner

*Primary Examiner*—Jason Chan
*Assistant Examiner*—Shi K. Li
(74) *Attorney, Agent, or Firm*—Staas & Halsey LLP

(57) ABSTRACT

A light output control circuit to update light output synchronously with input data in burst signal transmission system is disclosed. The circuit has a function of issuing light deterioration warning unerringly, which includes: a monitoring portion to detect light output emitted from a light emission element driven in accordance with transmission data; a level comparator to compare a monitoring signal outputted from the monitoring portion with a reference signal; a data detection portion to detect the existence of the transmission data; and an output controller to determine whether a light output deterioration warning is to be issued using an output signal of the data detection portion and an output signal of the level comparator.

12 Claims, 24 Drawing Sheets

In the case of n = 3 bits

In the case of n = 3 bits

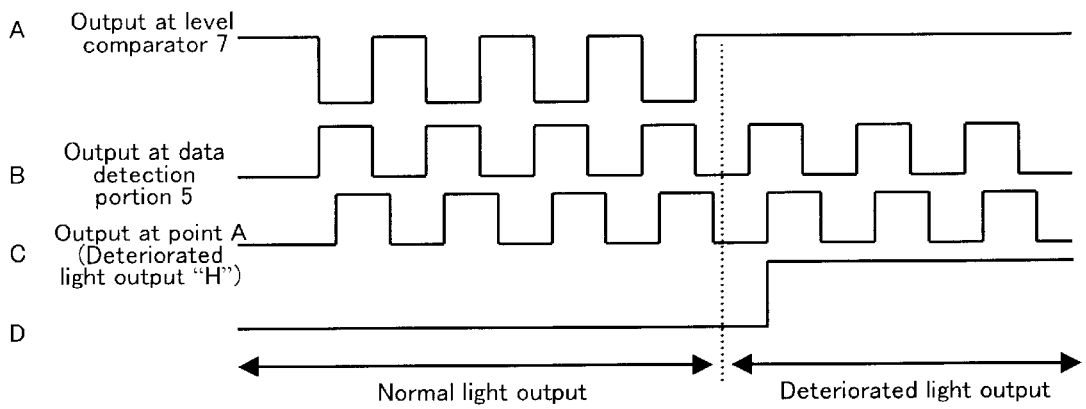
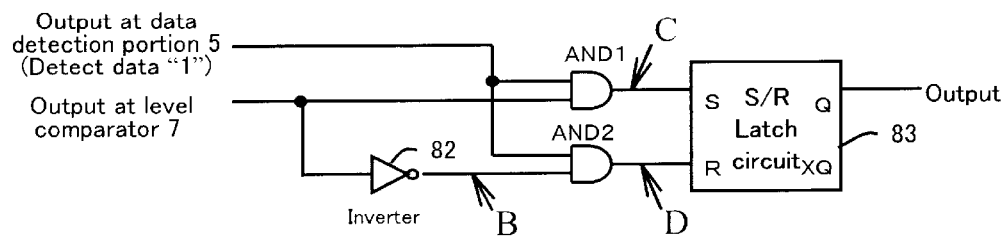
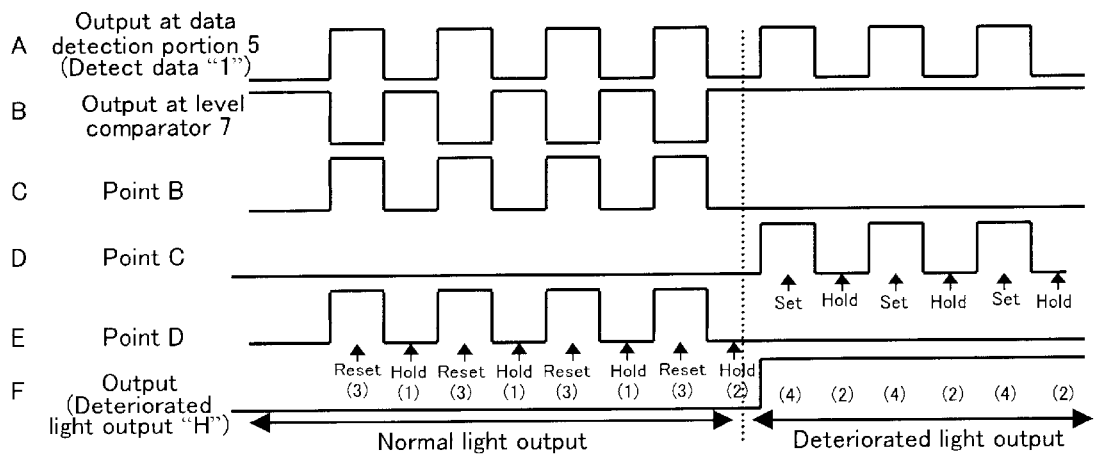

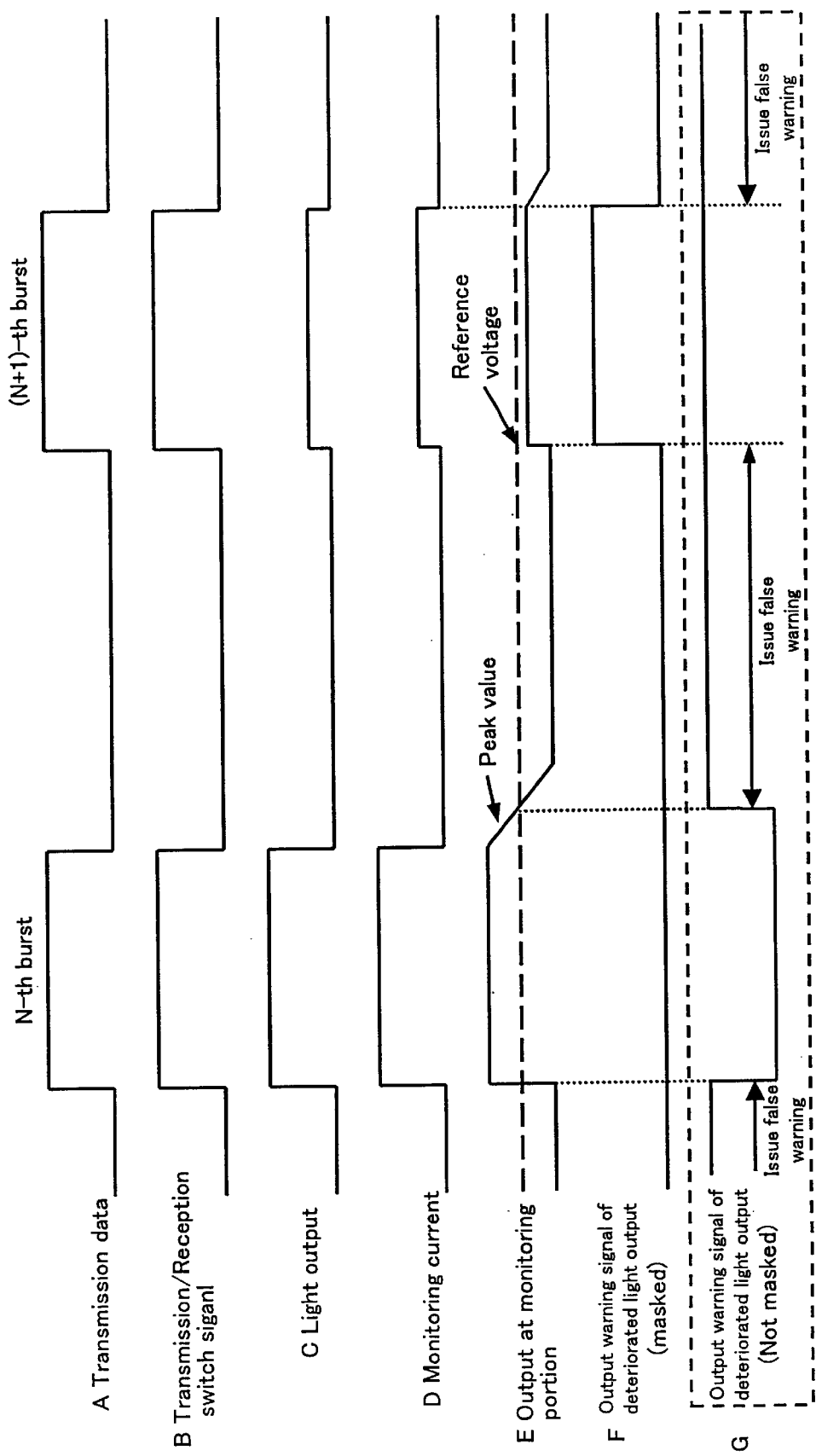

LIGHT OUTPUT CONTROL CIRCUIT WITH A WARNING FUNCTION OF DETERIORATED LIGHT OUTPUT

FIELD OF THE INVENTION

The present invention relates to a light output control circuit applicable for optical communication etc. having a driving circuit of a light emission element such as a semiconductor laser (LD: laser diode) or a light emission diode (LED) and more particularly a light output control circuit for controlling constant light output level provided with a warning function of deteriorated light output.

BACKGROUND OF THE INVENTION

In equipment such as optical transmission equipment which uses a light emission element, it is generally required to control light output to maintain at a predetermined value.

The efficiency of a light emission element such as an LD largely depends on temperature and also has a property of aged deterioration. It is therefore necessary to control to feed appropriate driving current to the light emission element in order to maintain light output level constant in any operating condition.

The APC (automatic power control) using negative feedback control has been introduced in a light output control circuit to control constant light output emitted by a light emission element.

In a light output control circuit to drive an emission element, a function is usually provided to monitor output power. A warning is issued when the output power decreases below a predetermined level. This facilitates to know appropriate time to replace the emission element caused by the breakdown or aged deterioration.

In FIG. 31, there is shown the first configuration example of a conventional light output control circuit to drive a light emission element. In this FIG. 31, pulse transmission data (DATA) is inputted with transmission input clock (CLK) to a D-type flip-flop (hereafter referred to as 'DFF') circuit 100, to be outputted to an LD driving circuit 101 after the pulse width of the input data (DATA) is corrected.

LD driving circuit 101, after receiving an output signal of DFF circuit 100, feeds a driving current to a laser diode (LD) to produce the LD emit light corresponding to the input data (DATA).

By using a light output control signal outputted from a comparator 102, a negative feedback function is carried out to produce stronger light emission when an LD light output is small, or to produce weaker light emission when the LD light output is large.

A photodiode (PD) receives a portion of the light outputted from the laser diode (LD) and converts the received light to the corresponding current to output. A current/voltage converter 103 converts the received current signal from the PD into a voltage signal.

A reference voltage generator 104 generates a reference signal from an input data (DATA) to output to comparator 102. It may also be possible that reference voltage generator 104 produces the reference voltage from a constant voltage generator.

A peak detection circuit 105 receives an output signal from current/voltage converter 103 to detect a peak value of the signal to forward to comparator 102. A capacitor is usually used in peak detection circuit 105 to detect the peak value.

Comparator 102 produces a differential value between the values of the reference signal from reference voltage generator 104 and the peak signal from peak detection circuit 105, then to feed to LD driving circuit 101 as a light output control signal.

Accordingly, the circuit shown in FIG. 31 performs the negative feedback control: a light output control signal from comparator 102 acts to increase an LD light output when the light output is small, and to the contrary to decrease the LD light output when the light output is large. Thus the LD light output is controlled to maintain a constant value.

In the above-mentioned first configuration of a conventional light output control circuit, there is shown in FIG. 32 an example of a circuit which outputs a warning signal of a deteriorated light output. In FIG. 32, the loop to control driving current illustrated in FIG. 31 is not shown.

Also in FIG. 32, current/voltage converter 103 and peak detection circuit 105 shown in FIG. 31 are integrated into one as a monitoring portion 106. A level comparator 107 compares an output of monitoring portion 106 to a threshold value which corresponds to the warning generation level led from constant voltage generator 108. When an output of monitoring portion 106 decreases below the threshold value from constant voltage generator 108, level comparator 107 outputs a warning signal of a deteriorated light output.

FIG. 33 shows the second configuration example of a conventional light output control circuit. Compared to the first configuration shown in FIG. 31, digital control is introduced in the driving current control circuit in FIG. 33 so that the circuit can easily be fabricated into an LSI.

In the configuration shown in FIG. 33, LD driving circuit 101 modulates driving current according to transmission data supplied by DFF circuit 100 to feed to the light emission element (LD). A peak value of the driving current (hereafter simply referred to as 'driving current value') is controlled so that a driving current value is proportional to a digital value inputted to a digital-to-analog converter 110.

The above digital value is fed from a pre-stage counter 109, and therefore the produced driving current value is proportional to a value of counter 109. A photo diode (PD) for monitoring produces a monitoring current proportional to the light amount emitted from an emission element (LD). Then, the monitoring current value is converted to a voltage value in monitoring portion 106, to be compared in comparator 102 to a reference voltage 104 (i.e. a target value).

A counter value of counter 109 is changed using the result of comparison performed by comparator 102 in which a differential amplifier is used. Namely, when an output of monitoring portion 106 is smaller than the reference value 104, the counter value in counter 109 is increased by 1 to increase a driving current value. Also, when an output of monitoring portion 106 is greater than the reference value, the value in counter 109 is decreased by 1 to reduce the driving current. Through the operation of a negative feedback amplification described above, a light output is controlled to fix to the constant reference value.

Here, in the light output control circuit shown in FIG. 33, the driving current is controlled at the precision determined by the resolution which is fixed by the least significant bit (LSB) in digital-to-analog converter 110. For example, when digital-to-analog converter 110 is composed of 10 bits, the obtained resolution becomes $2^{10}=1024$. When an output current to be controlled by this circuit ranges from 10 mA to 100 mA, a current source in LD driving circuit 101 is designed so that the LSB corresponds to 0.1 mA.

Also, the variation of digital values ranging from 100 to 1000 is so designed as to correspond to the variation of a driving current from 10 mA to 100 mA. Then, since the current 0.1 mA of the LSB corresponds 1% of the least value (10 mA) of the driving current, an accurate control having approximately 1% accuracy of driving current (also proportional to light output) can be achieved.

In the aforementioned second configuration of the conventional light output control circuit, a circuit to issue a light output deterioration warning may be similar to the deterioration warning circuit shown in FIG. 32 in the first configuration of the conventional light output control circuit shown in FIG. 31.

In an access system for optical communication system which has been in practical use in recent years, a burst transmission system is known as a required transmission system between subscribers and a switching office, in which data partitioned into cells are intermittently transmitted.

FIG. 34 illustrates an operational problem which may occur when the conventional light output control circuit shown in FIG. 31 or FIG. 33 is applied for the burst transmission system.

In FIG. 34, the horizontal axis and the vertical axis respectively denote the time and the driving current value. Here, the case of continuous light output is considered, as shown in FIG. 34A. Time is necessary after light emission element is driven to produce desired stable light output. In other words, an initial state (I) is required before a normal state (II) is attained.

In order to ensure the initial state in a light output control circuit of a burst transmission system, a starting cell SC may be inserted prior to a normal cell NC, as shown in FIG. 34B. However, a quite short time i.e. a few micro seconds corresponding to the duration of the starting cell SC is allowed before the light output reaches a target value.

Therefore, a longer rise time in addition to the duration of the starting cell SC is required. This may penetrate into the duration of the normal cell NC for communication, during which the light output can not be used for transmission.

To sum up, the following technical requirements must be satisfied for a light output control circuit to drive a light emission element to be used for a burst transmission system:

(1) To obtain quick response to reach the required light output.

(2) To control light output with high precision.

(3) To function APC (automatic power control) to cope with burst signals i.e. to maintain light output for a sufficient time during no-signal period between each burst signal, as well as to cope with the variation in the ambient temperature.

(4) To reduce the number of components externally attached to a semiconductor integrated circuit.

In the first configuration example of a conventional light output control circuit shown in FIG. 31, the above requirement (1) may be realized if the response speed to detect peak value improves in peak detection circuit 105. This may be achieved by providing a capacitor of smaller capacitance in peak detection circuit 105 and by feeding a larger charging current. Also, the above requirement (2) may be realized by increasing negative feedback gain.

A problem exists, however, that in order to realize the above requirement (3), light output must be maintained for a long time by providing larger capacitance to maintain peak value in peak detection circuit 105. This may practically damage a quick response characteristic required in the above (1).

Furthermore, a capacitance leak in a capacitor to maintain peak value and a leak current in an FET used in the circuit may damage the high precision control for the above requirement (2). Moreover, it is difficult to compensate light output when abrupt change of the ambient temperature occurs between burst signals.

To satisfy the above requirement (4), it is required to maintain light output for a long time, for example for a few milliseconds, by providing a capacitor having capacitance of several micro farads. This necessitates attaching an outer component because of difficulty in fabricating such large capacitor in an LSI, and makes it difficult to compose smaller circuit configuration.

As having discussed above, it is difficult to satisfy all the above four requirements (1) to (4) at a time when using the first circuit configuration of the conventional light output control circuit shown in FIG. 31.

As a method to realize the above four requirements (1) to (4), the second circuit configuration of the conventional light output control circuit shown in FIG. 33 may be chosen. Hereafter, an operational characteristics shown in FIG. 35 is discussed with regard to the second circuit configuration of the conventional light output control circuit shown in FIG. 33. In FIG. 35, the horizontal and the vertical axes denote the time and the driving current value, respectively.

At the start of operation, the value of counter 109 has already been reset. When the aforementioned feedback operation is started, the value of counter 109 is updated by either adding or subtracting 1 at each step. This is carried out according to the result of comparing an output of monitoring portion 106 with the reference value 104. Accordingly, the driving current value is updated to make the driving current change stepwise.

In this case, the driving current value changes by the step of 0.1 mA corresponding to the least significant digit (LSB) of a digital-to-analog converter. When the driving current reaches the target value, the driving current value drifts between the two values centered by the target value. Thus a stable light output is obtained corresponding to the driving current within this range.

According to this conventional technique, a counter value is increased by 1 (at the unit of the LSB) from zero at the start until the desired light output is produced. Therefore, in the case a larger current (i.e. larger digital counter value) is required to produce a desired light output, a larger number of steps are necessary, resulting in a longer rise time.

For example, in order to obtain the maximum driving current of 100 mA in the case a 10-bit digital-to-analog converter 110 is used, the counter value started from zero has to be updated 1024 times in the worst case to produce desired stable light output.

Also in the case of continuous transmission, data cannot be transmitted during the startup period shown as the initial state (I) in FIG. 34A. To cope with this problem, it is required either to lengthen the startup time of an overall system, or to shorten the timing margin of the system.

In the conventional light output control circuit, there is a defect that a light output value cannot be fed back in the burst transmission method where no-data period continues for a long time. To cope with this, in the conventional digital light output control circuit of data-synchronous type, the light output update timing is determined by checking the existence of input data.

The deteriorated light warning circuit shown in FIG. 32 has also been used in the second configuration of a light output control circuit shown in FIG. 33.

As a concrete example of the second light output control circuit shown in FIG. 33, there has been a method to control to update a driving current (i.e. to update light output)

synchronously when successive n bits of '1' appear in data for transmission.

In such a configuration, there may be cases that the monitoring signal level for data having less than successive n bits of '1' is deteriorated, compared to the intrinsic value, caused by the insufficient bandwidth of current/voltage converter to convert a monitoring current to a voltage signal.

FIG. 36 illustrates such undesirable condition as described above. In FIG. 36, an example of data is shown for one burst period.

In the case a warning circuit of a deteriorated light output shown in FIG. 32 is applied, a false warning may possibly be issued in the period (I) and period (II), as shown in FIG. 36, when data having less than successive n bits of '1' (3 bits in the example shown in FIG. 36) is inputted.

Namely, in the period of (I) and (II) in FIG. 36, the respective number of successive '1' is one bit. Therefore, as mentioned above, a peak value (B) of a monitoring voltage output (A) cannot exceed a threshold voltage (C) because of an insufficient bandwidth of monitoring portion 106.

This results in issuing a false warning of light deterioration because level comparator 107 determines the light output is below the reference value 108. On the other hand, in the period (III) having more than three successive bits of '1', a warning is not issued because the peak value (B) of the monitoring voltage output (A) exceeds the threshold voltage (C). In the latter zone of period (III), the number of successive bits of '1' is one, but the peak value (B) gradually decreases and a warning is not issued until the peak value (B) falls below the threshold value (C).

FIG. 37 illustrates that a problem arises between burst signals in the case of burst signal transmission when a conventional warning circuit of a deteriorated light output shown in FIG. 32 is applied.

In FIG. 37, the N-th burst and the (N+1)-th burst are shown as transmission data (A). Light output (C) is produced only during a burst period using a transmission/reception switch signal (B). Accordingly, a monitoring current (D) is outputted while the light output (C) appears. However, if a time constant to maintain a peak value in monitoring portion 106 is insufficiently small, the peak value of a monitoring voltage from monitoring portion 106 gradually decreases after the burst signal is suspended, and falls below the threshold value before the succeeding burst signal appears.

Therefore, in this case, a false warning is issued between the period of burst signals (as shown in FIG. 37G). In order to avoid such malfunction of false warning which arises in the intervals of burst signals, a measure is taken so that a deterioration warning output is masked during non-existent period of burst signals using a transmission/reception switch signal. Thus a false warning may be prevented (refer to FIG. 32 and FIG. 37F).

However, there may be a case depending on a system that a relevant process is not carried out outside the light output control circuit of the equipment, as shown in FIG. 37. Also there may be a case that an external signal is not inputted to the LSI. In such cases, the conventional warning circuit of a deteriorated light output cannot be used, and measures against the following issues are required:

(1) To cope with a light output control circuit having light output updated synchronously with input data, and
(2) To cope with a burst transmission system even in case no appropriate measure is taken outside the circuit of the equipment, or no external signal applied to switch transmission/reception condition. (i.e. to prevent from issuing any false warning of a deteriorated light output in the intervals of burst signals.)

SUMMARY OF THE INVENTION

It is an object of the present invention to provide a light output control circuit which may be applied to a burst transmission system, having an unerring warning output function of deteriorated light in a light output control circuit in which light output is updated synchronously with input data.

As the basic configuration of a light output control circuit of the present invention to attain the above object includes; a monitoring portion to detect light output from a light emission element which is driven in accordance with data to be transmitted; a level comparator to compare a monitoring signal from the monitoring portion with a reference signal; a data detection portion to detect the existence of data to be transmitted; and an output control portion to determine to output a warning using an output signal of the data detection portion and the level comparator.

As the second configuration of the invention, the data detection portion in the above basic configuration outputs a detected signal of 'existence of transmission data' when successive n bits of '1' is detected in the transmission data.

As the third configuration of the invention, the data detection portion in the above basic configuration outputs a detected signal of 'no existence of transmission data' when successive n bits of '0' is detected in the transmission data.

As the fourth configuration, the output control portion in the above basic configuration includes; a delay circuit to delay an output signal of the data detection circuit; and a flip-flop to input into a data terminal an output of the level comparator using an output of the delay circuit as a clock signal.

As the fifth configuration, the output control portion in the above second configuration includes; the first AND gate to produce logical product of an output of the data detection portion and an output of the level comparator; an inverter to invert an output signal of the level comparator; the second AND gate to produce logical product of an output signal of the data detection portion and an output signal of the inverter; a latch circuit to which an output of the first AND gate is inputted as a set signal and an output of the second AND gate is inputted as a reset signal.

As the sixth configuration, the output control portion in the above third configuration includes; the first NOR gate to produce inverted logical sum of an output signal of the data detection portion and an output of the level comparator; an inverter to invert an output of the level comparator; the second NOR gate to produce inverted logical sum of an output signal of the data detection portion and an output signal of the inverter; and a latch circuit to which an output of the second NOR gate is inputted as a set signal and an output of the first NOR gate is inputted as a reset signal.

As the seventh configuration, in the above second configuration or the above third configuration, a delay circuit is provided between the data detection portion and the output control portion in order to synchronize phases between the transmission data and an output of the level comparator. Accordingly, the input timing of an output of the data detection portion to the output control portion coincides with the input timing of an output signal of the level comparator to the output control portion.

As the eighth configuration, the delay circuit in the seventh configuration includes a timer in which the counting is originated by an output signal of the data detection portion.

As the ninth configuration, in the second configuration or the third configuration, the threshold level of the reference signal to be inputted to the level comparator varies according to an output state of the output control portion provided with a hysteresis characteristic.

As the tenth configuration, in the second configuration or the third configuration, a reset signal generator is provided by which a reset signal forcibly resets the output state of the output control portion.

As the eleventh configuration, the reset signal in the tenth configuration is generated when either transmission data or clock signals do not exist for a certain period.

As the twelfth configuration, when the light output control circuit is constituted by an LSI, the reset signal in the tenth configuration is a signal supplied from outside the LSI.

Any further features and advantages of the present invention will become more apparent by the explanation of embodiments of the invention referring to the accompanied charts and drawings.

BRIEF DESCRIPTION OF THE DRAWINGS

FIG. 11 is a time chart to illustrate the operation of the embodiment shown in FIG. 10.

FIG. 12 is another circuit configuration of output controller 8.

FIG. 13 is an operation time chart of the circuit shown in FIG. 12.

FIG. 37 is a problem caused by applying the conventional warning circuit of a deteriorated light output shown in FIG. 32 which occurs in the intervals of burst signals in the burst signal transmission system.

DESCRIPTION OF THE PREFERRED EMBODIMENTS

Embodiments of the present invention are explained hereafter referring to the accompanied charts and drawings, wherein like numerals or symbols refer to like parts.

Figure 1:
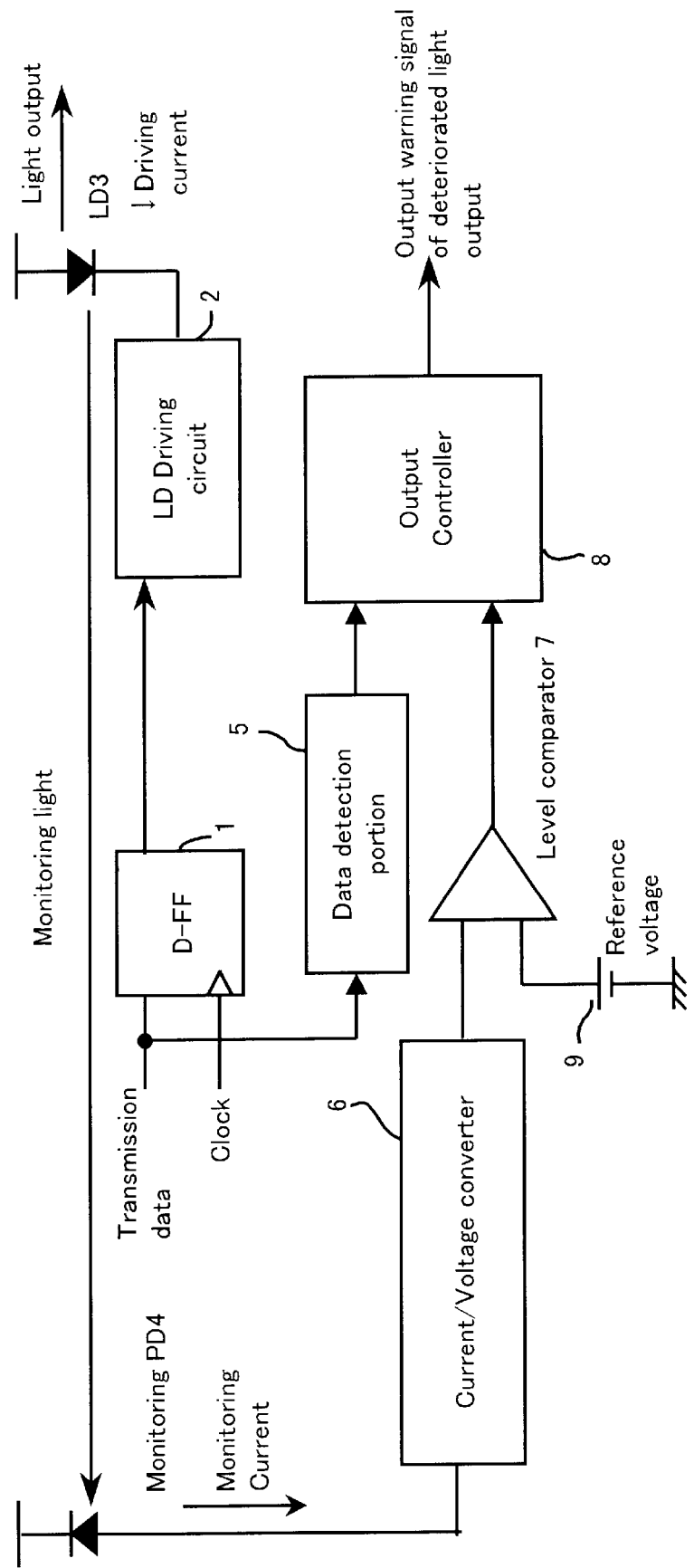
FIG. 1 is a block diagram of the first embodiment of the present invention.

FIG. 1 shows a block diagram of the first embodiment of the present invention. In FIG. 1, pulse-shaped transmission data and clock signals are inputted to a DFF circuit 1, in which the pulse width is arranged to output to an LD driving circuit 2.

LD driving circuit 2 receives output signals from DFF circuit 1 to supply driving current to a light emission element 3 to emit light according to the input data. A light receiving element for monitoring PD4 receives back light of light emission element LD3 to convert to electric signals.

As shown in FIG. 1, there are provided a data detection portion 5 to supervise the input condition of transmission data, and a current/voltage converter 6 to convert current signals produced by light receiving element for monitoring PD4 into voltage signals. A level comparator 7 compares an output signal of current/voltage converter 6 with a reference signal 9. An output of level comparator 7 and an output of data detection portion 5 are inputted to an output controller 8.

Output controller 8 has a function to determine whether a condition arises to issue a warning of a deteriorated light output according to the output of data detection portion 5 and the output of level comparator 7. It may also be possible that a monitoring signal to be inputted into level comparator 7 is produced by a peak detection circuit attached to current/voltage converter 6, to define the monitoring signal as a peak value of the signal which has been converted into voltage.

Figure 2:
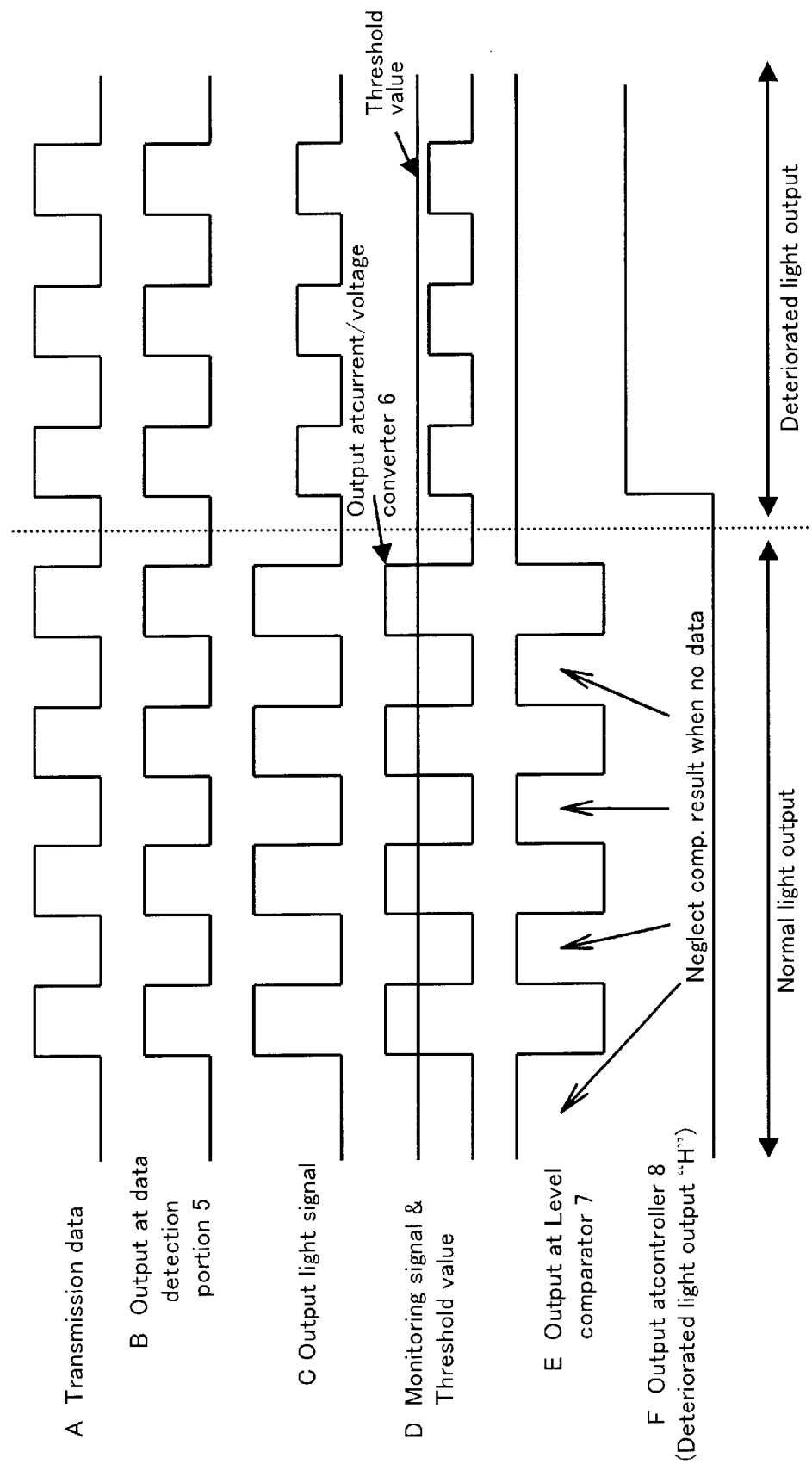
FIG. 2 is an operation of the first embodiment of the present invention.

FIG. 2 illustrates operation of the first embodiment of the present invention shown in FIG. 1.

The first embodiment of the invention is explained hereafter. In the following explanation, it is set forth as a premise that level comparator 7 outputs the signal 'L' when the light output is normal i.e. the output of current/voltage converter 6 is greater than reference signal 9, and also level comparator 7 outputs the signal 'H' when the light output is deteriorated i.e. the output of current/voltage converter 6 is smaller than reference signal 9.

In addition, when the above polarity is defined reversely, it is possible that the polarity in succeeding circuits of level comparator 7 is reversed.

When a transmission data A is inputted, light emission element LD3 outputs a light signal C corresponding to the transmission data A. Photo detection element PD for monitoring 4 then outputs a current signal corresponding to the light signal outputted by light emission element LD3.

Also, data detection portion 5 outputs a signal B according to the existence of the transmission data. Current/voltage converter 6 outputs a monitoring signal D which has a voltage corresponding to a current signal which is outputted by light receiving element for monitoring PD4.

Level comparator 7 outputs the result of comparing the monitoring signal D with reference signal 9 as a threshold value (FIG. 2E). Output controller 8 outputs the output signal of level comparator 7 only in the case that data detection portion 5 determines the data exists. In the case data detection portion 5 determines the data does not exist, output controller 8 maintains the output in the preceding state.

The relation between the inputs and outputs of output controller 8 is shown in the following Table 1.

TABLE 1

Relation between inputs/outputs of output controller 8

| Inputs | | | |
|---|---|---|---|
| Outputs of data detection portion 5 (Data existent: H) (No data existent: L) | Outputs of level comparator 7 (Deteriorated light output: H) (Normal light output: L) | Outputs | Remarks |
| L | L | Maintain preceding state | |
| L | H | Maintain preceding state | |
| H | L | L | |
| H | H | H | Warning issue of deteriorated light output |

Figure 3:
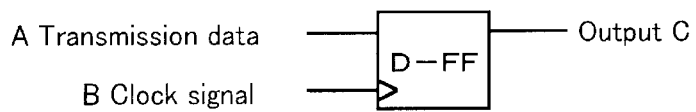
FIG. 3 is an example of a data detection circuit applicable to a data detection portion 5 of the first embodiment of the present invention.
Figure 4:
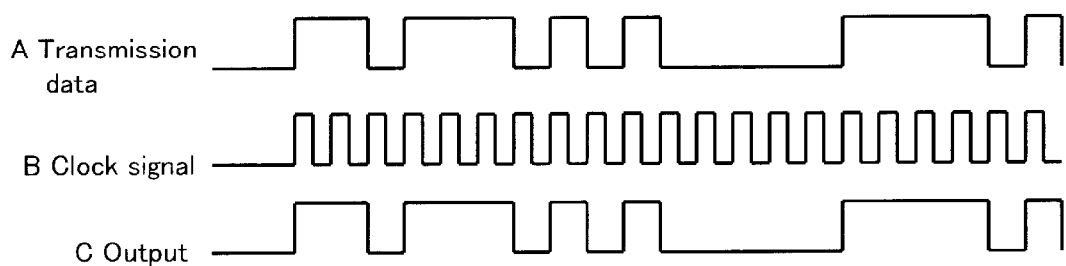
FIG. 4 is an operation time chart to illustrate the operation of the embodiment shown in FIG. 3.

FIG. 3 shows an example of a data detection circuit to be used for data detection portion 5 in the first embodiment of the present invention. FIG. 4 shows an operation time chart to illustrate the operation of the first embodiment.

The data detection circuit shown in FIG. 3 includes a DFF circuit, to which transmission data and clock signals are inputted, to detect transmission data inputted to a light output controller incorporated in an LSI, using clock signals.

As shown in FIG. 4, an output C corresponding to transmission data A is outputted synchronously with clock B.

Figure 5:
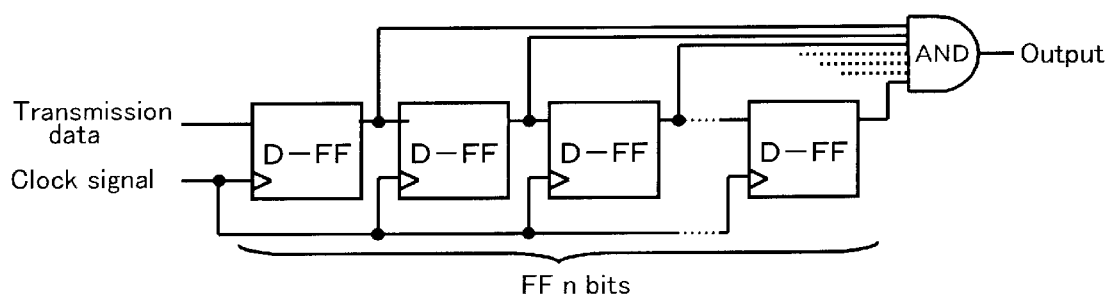
FIG. 5 is an example of a detection circuit to detect successive n bits applicable as another embodiment of data detection portion 5.
Figure 6:
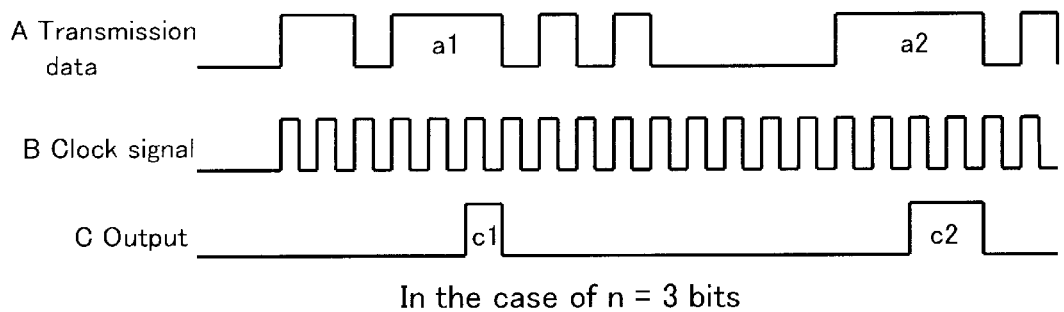
FIG. 6 is an operation time chart of the embodiment shown in FIG. 5.

FIG. 5 shows another example of detection circuit 5, which detects successive n bits, of which time chart is shown in FIG. 6.

Detection portion 5 shown in FIG. 5 includes n DFF circuits and an AND gate to produce logical product of non-inverted output signals of each DFF circuits. The output is produced corresponding to data having successive n bits of '1' in transmission data A. FIG. 6 shows an operation in the case of n=3 bits. Corresponding to data $a_1$ and $a_2$ having more than three successive bits of '1', outputs $c_1$ and $c_2$ are produced from an AND gate.

Figure 7:
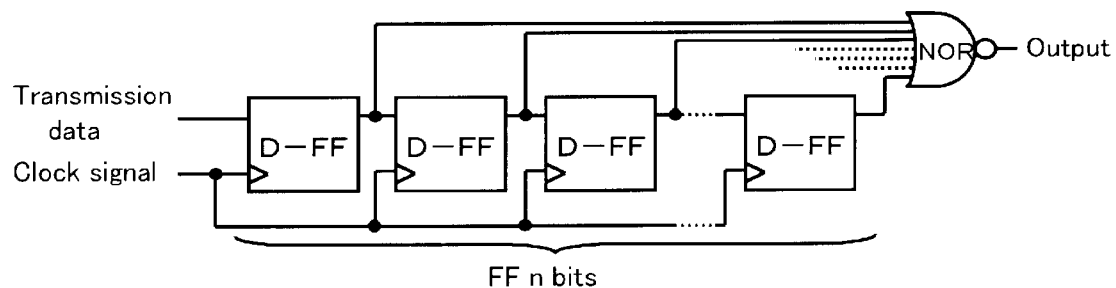
FIG. 7 is another example of a detection circuit to detect successive n bits applicable as still another embodiment of data detection portion 5.
Figure 8:
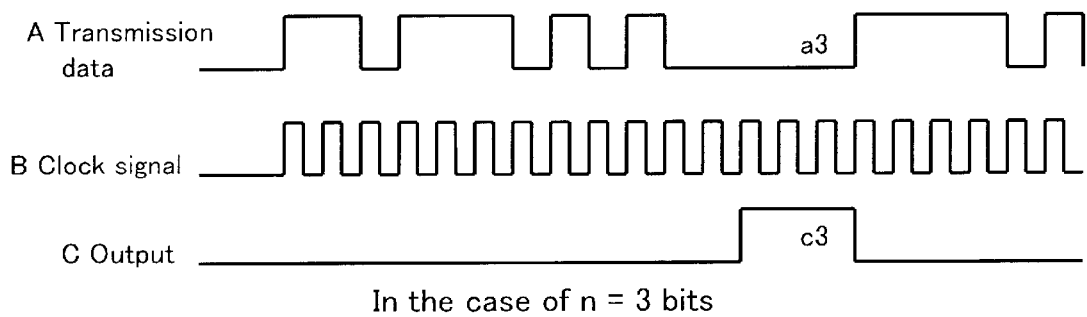
FIG. 8 is an operation time chart of the embodiment shown in FIG. 7.

FIG. 7 shows another example of data detection portion 5 which can detect successive n bits, of which operation is shown in FIG. 8. The detection circuit shown in FIG. 7 includes n DFF circuits and NOR gates, to produce an inverted logical sum of non-inverted output signals of these DFF circuits. This circuit outputs 'H' when successive n bits of '0' continue in transmission data A. FIG. 8 shows the operation when n=3 bits. Output $c_3$ is produced from NOR gate corresponding to data $a_3$ in which more than three successive bits of '0' continue.

As shown above, data detection portion 5 is the circuit to detect the existence of transmission data. According to a feature of the present invention, it is possible to control to output a warning of deteriorated light output depending on the existence of transmission data.

For this purpose, it is merely needed in data detection portion 5 to detect either '1' or '0' of the transmission data. A warning circuit of a deteriorated light output of the present invention operates synchronously with either data '1' or data '0', depending on data detection portion 5 detects either '1' or '0' of the data.

There is no further difference than the above-mentioned. The basic principle to operate synchronously with data is identical, whichever data '1' or '0' is detected by data detection portion 5. Therefore any of the circuit shown in FIG. 3, FIG. 5 and FIG. 7 is applicable to the embodiment shown in FIG. 1.

Figure 9:
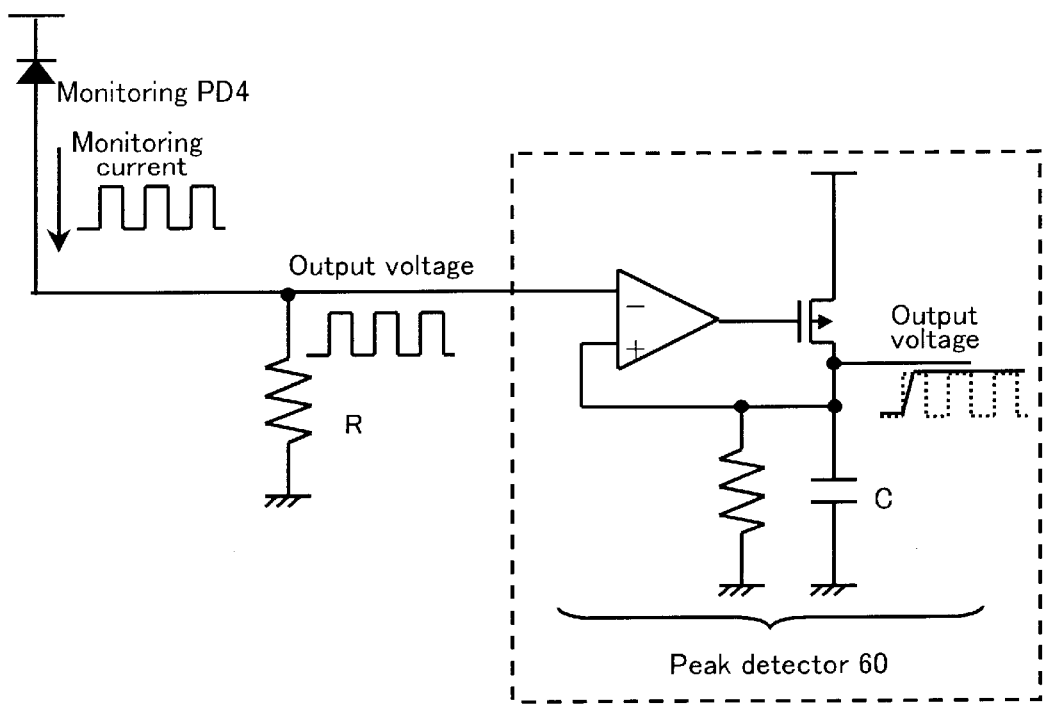
FIG. 9 is a circuit example of a current/voltage converter 6 used in the first embodiment of the invention.

In FIG. 9, there is shown an example of current/voltage converter 6 to be used in the first embodiment of the present invention. The circuit converts to a voltage signal by making a monitoring current produced from light receiving element for monitoring PD4 flow into a resistor R. In addition, current/voltage converter 6 provides a peak detector 60 in case it is necessary. Peak detector 60 detects a peak voltage of the converted voltage signal using the resistor R, to store in a capacitor C.

A differential amplifier is used in level comparator 7 of the first embodiment of the present invention. As a constant voltage 9 to generate a threshold voltage corresponding to a warning generation level, a general-purpose constant voltage generator using a BGR or a Zener diode, etc. is applied. Otherwise, a voltage produced from a constant current flow in a fixed resistor may be used as the constant voltage 9.

Figure 10:
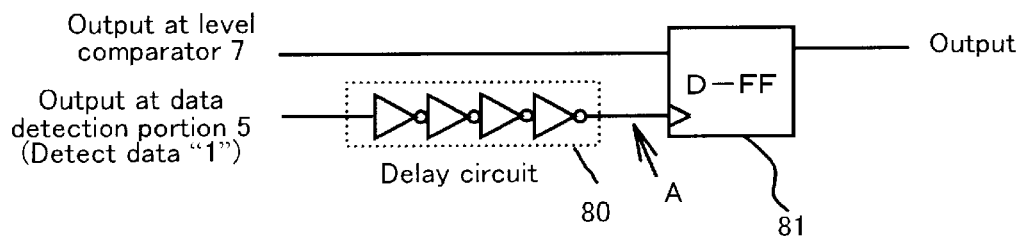
FIG. 10 is a circuit example of an output controller 8 used in the first embodiment of the invention.

In FIG. 10, there is shown a circuit example of output controller 8 to be used for the first embodiment of the present invention, and the operation thereof is illustrated in FIG. 11.

The circuit of output controller 8 shown in FIG. 10 can be applied when data detection portion 5 is aimed to detect data '1'. An output A of level comparator 7 and an output B of data detection portion 5 are inputted to output controller 8. Delay is added to the output of data detection portion 5 by a delay circuit 80, to input to DFF circuit 81 as a clock C.

When an output of level comparator 7 becomes logical '1', this is detected at the timing of clock C, and logical '1' signal is outputted from DFF circuit 81 as a deteriorated light output signal.

In FIG. 12, there is shown another circuit configuration of output controller 8 with an operation time chart shown in FIG. 13. Output controller 8 includes: the first AND gate AND1 to produce logical product of an output signal of data detection portion 5 and an output signal of level comparator 7; and the second AND gate AND2 to produce logical product of the output signal of data detection portion 5 and an inverted output signal of level comparator 7 which is produced from an inverter 82.

Output controller 8 further includes an S/R latch circuit 83 having a set terminal S to which an output of the first AND gate AND1 is inputted; and a reset terminal R to which an output of the second AND gate AND2 is inputted.

Referring to FIG. 13, the operation is explained as follows, where data detection portion 5 shown in either FIG. 3 or FIG. 5 and output controller 8 shown in FIG. 12 are used.

(1) In the case both an output A of data detection portion 5 and an output B of level comparator are '0', which means 'no data existent' and 'light output not deteriorated', a deterioration warning output maintains the preceding output state because the state of S/R latch circuit 83 is held.

(2) In the case the output of data detection portion 5 is '0' and the output of level comparator is '1', which means 'no data existent' and 'light output deteriorated', the deterioration warning output maintains the preceding output state because the state of S/R latch circuit 83 is held.

(3) In the case the output of data detection portion 5 is '1' and the output of level comparator is '0', which means 'data existent' and 'light output not deteriorated', the deterioration warning output is set to '0' because S/R latch circuit 83 is turned to the reset condition.

(4) In the case both the output of data detection portion 5 and the output of level comparator are '1', which means 'data existent' and 'light output deteriorated', a deterioration warning output is set to '1' because S/R latch circuit 83 is turned to the set condition.

As described above, the operation of output controller 8 is the same as that shown in Table 1. Thus an output function of a deteriorated light output warning is obtained synchronously with the transmission data.

Figure 14:
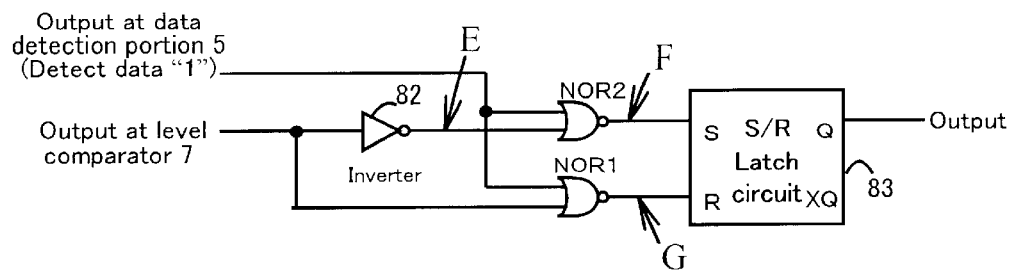
FIG. 14 is a block diagram of still another configuration example of output controller 8.

In FIG. 14, there is shown another example of a circuit of output controller 8 applicable when data detection portion 5 detects '0' in transmission data. In this case, the logic must be different from that of the example shown in FIG. 12 because of an opposite polarity. Namely, the circuit in FIG. 14 includes: the first NOR gate NOR1 to produce an inverted logical sum of an output signal of data detection portion 5 and an output signal of level comparator 7; an inverter 82 to invert the output signal of level comparator 7; and the second NOR gate NOR2 to produce an inverted logical sum of an output of inverter 82 and the output of data detection portion 5.

Furthermore, the circuit includes an S/R latch circuit 83 having reset terminal to which an output of the first NOR gate NOR1 is inputted and set terminal to which an output of the second NOR gate NOR2 is inputted.

Figure 15:
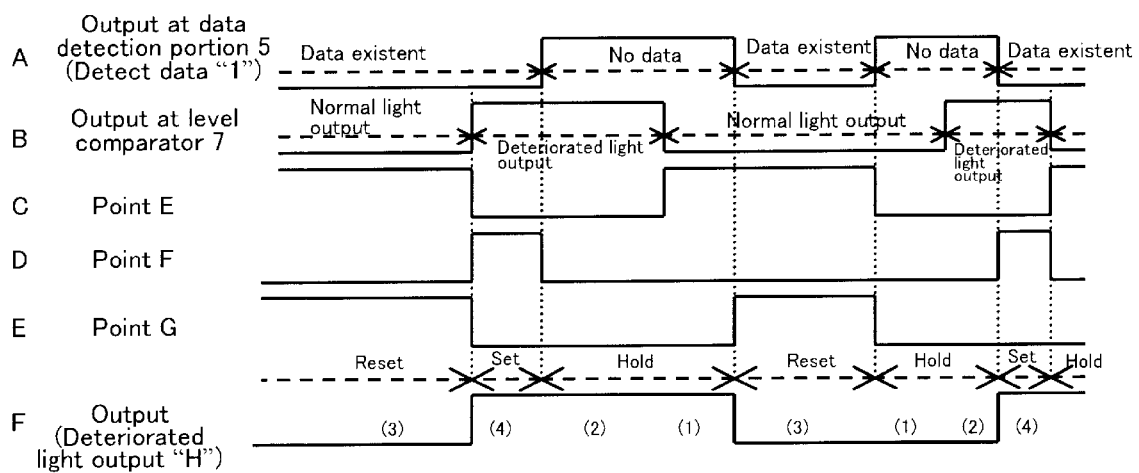
FIG. 15 is an operation time chart of the configuration shown in FIG. 14.

Referring to a time chart shown in FIG. 15, the operation of the circuit using data detection portion 5 shown in FIG. 7 and output controller 7 shown in FIG. 14 is explained as follows. It should be noted that, in the case the circuit shown in FIG. 7 is used as data detection portion 5, a monitoring signal to be inputted to level comparator 7 must be either a peak value or an average value detected from an output signal of current/voltage converter 6.

(1) In the case that both an output signal of data detection portion 5 and an output signal of level comparator 7 are '0', which means 'no data existent' and 'light output not deteriorated', a deterioration warning output maintains the preceding output state because the state of S/R latch circuit 83 is held.

(2) In the case that the output signal of data detection portion 5 is '0' and the output signal of level comparator 7 is '1', which means 'no data existent' and 'light output deteriorated', the deterioration warning output maintains the preceding output state because the state of S/R latch circuit 83 is held.

(3) In the case that the output signal of data detection portion 5 is '1' and the output signal of level comparator 7 is '0', which means 'data existent' and 'not deteriorated', the deterioration warning output is set to '0' because the S/R latch circuit 83 is turned to the reset condition.

(4) In the case that both an output signal of data detection portion 5 and an output signal of level comparator 7 are '1', which means 'data existent' and 'output deteriorated', a deterioration warning output is set to '1' because the S/R latch circuit 83 is turned to the set condition.

Accordingly, the operation of the embodiment shown in FIG. 14 is also identical to that shown in Table 1. Thus an output function of a deteriorated light output warning is obtained synchronously with the transmission data.

In the embodiment shown in FIG. 1, the required time $t_{monitoring}$ from the input of transmission data to the determination of the output level comparator 7 is as shown below.

$t_{monitoring}$=[circuit delay in DFF circuit 1+LD driving circuit 2]+[emission delay in light emission element LD3]+[circuit delay in current/voltage converter 6]+[circuit delay in level comparator 7]

Also, the following time $t_{data}$ is required for the determination of data detection portion 5;

$t_{data}$=[circuit delay in data detection portion 5]

When the relation between $t_{monitoring}$ and $t_{data}$ is $t_{monitoring}>t_{data}$, a phase of the output of data detection portion 5 must coincide with a phase of the output of level comparator 7 generated from the same transmission data to determine the output of output controller 8.

Figure 16:
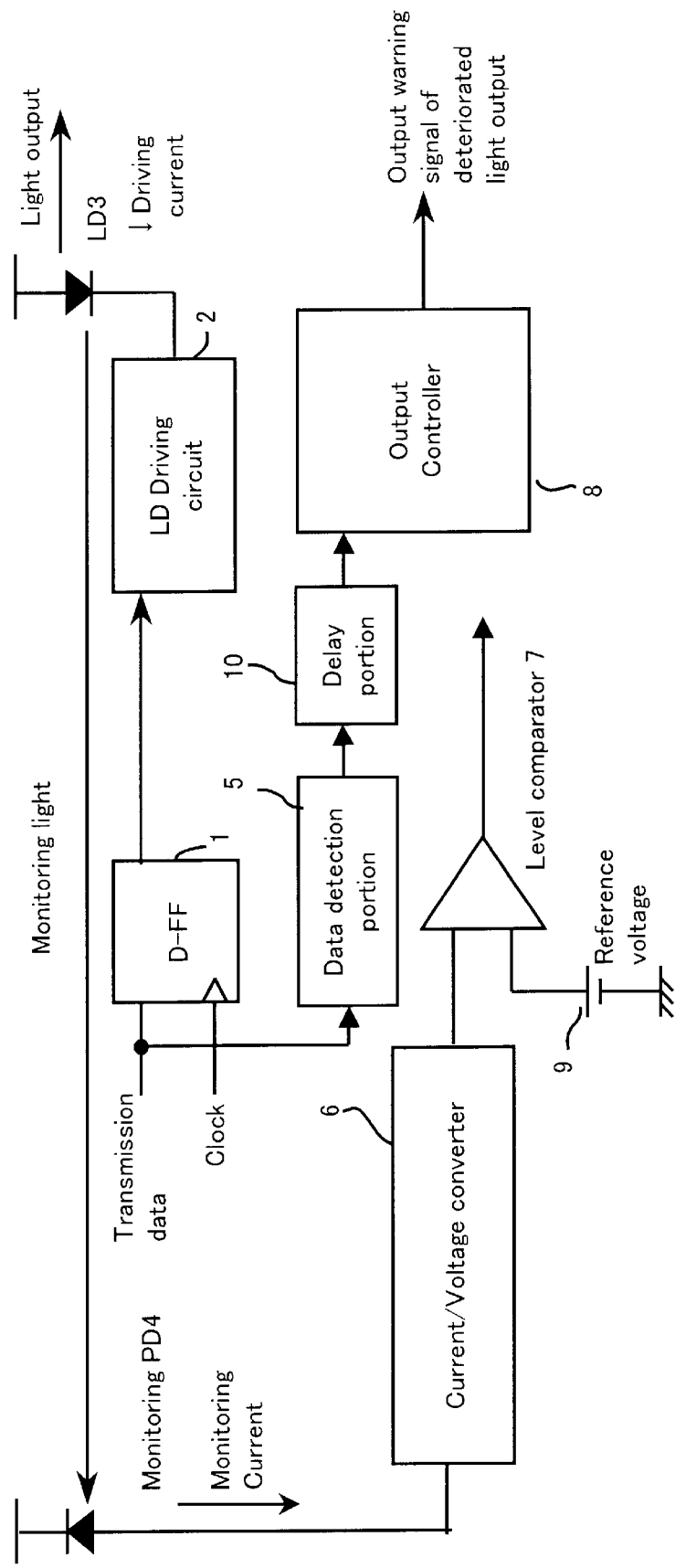
FIG. 16 is a block diagram of the second embodiment in which a delay portion 10 is inserted between data detection portion 5 and output controller 8.

In FIG. 16, there is shown a block diagram of the second embodiment in which a delay portion 10 is inserted between data detection portion 5 and level comparator 7 in order to produce an output phase of data detection portion 5 coinciding with an output phase of level comparator 7.

An output of data detection portion 5 is delayed by delay portion 10 for the time until an output of level comparator 7 is determined, to be inputted to output controller 8. Accordingly, phases between an output of data detection portion 5 and an output of level comparator 7 coincide with each other.

Figure 17:
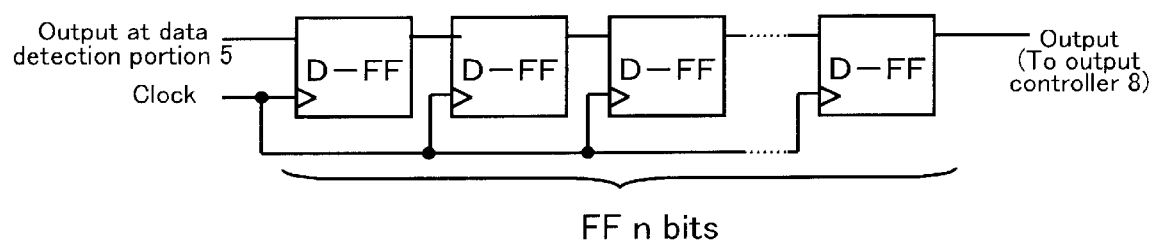
FIG. 17 is the first example of delay portion 10 used in the second embodiment.
Figure 18:
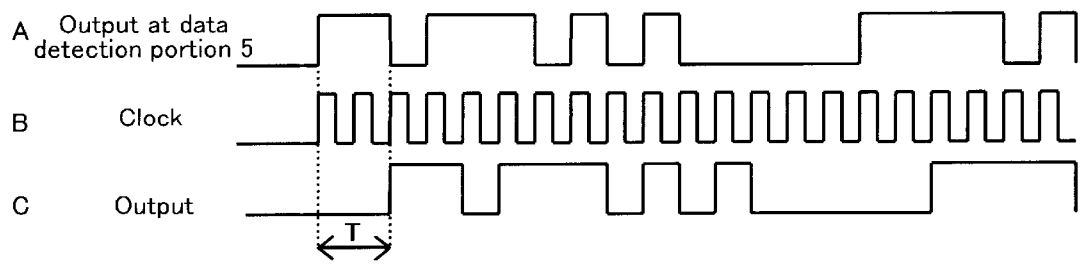
FIG. 18 is an operation of the circuit example shown in FIG. 17.

In FIG. 17, there is shown the first circuit example of delay portion 10 to be used for the second embodiment of the present invention. An operation thereof is shown in FIG. 18.

A circuit example of delay portion 10 shown in FIG. 17 has a shift register using n DFF circuits. Using this circuit, an output of data detection portion 5 can be delayed for the time until an output of level comparator 7 is determined, to obtain the coincidence of phases between inputs fed into output controller 8.

In FIG. 17, the output A of data detection portion 5 can be synchronized with the clock B to produce a delay for the time T which is more than the time required from the detection of data to the determined output of level comparator 7. FIG. 18 shows an example of a operation time chart, in which the case of n=3 is shown.

Figure 19:
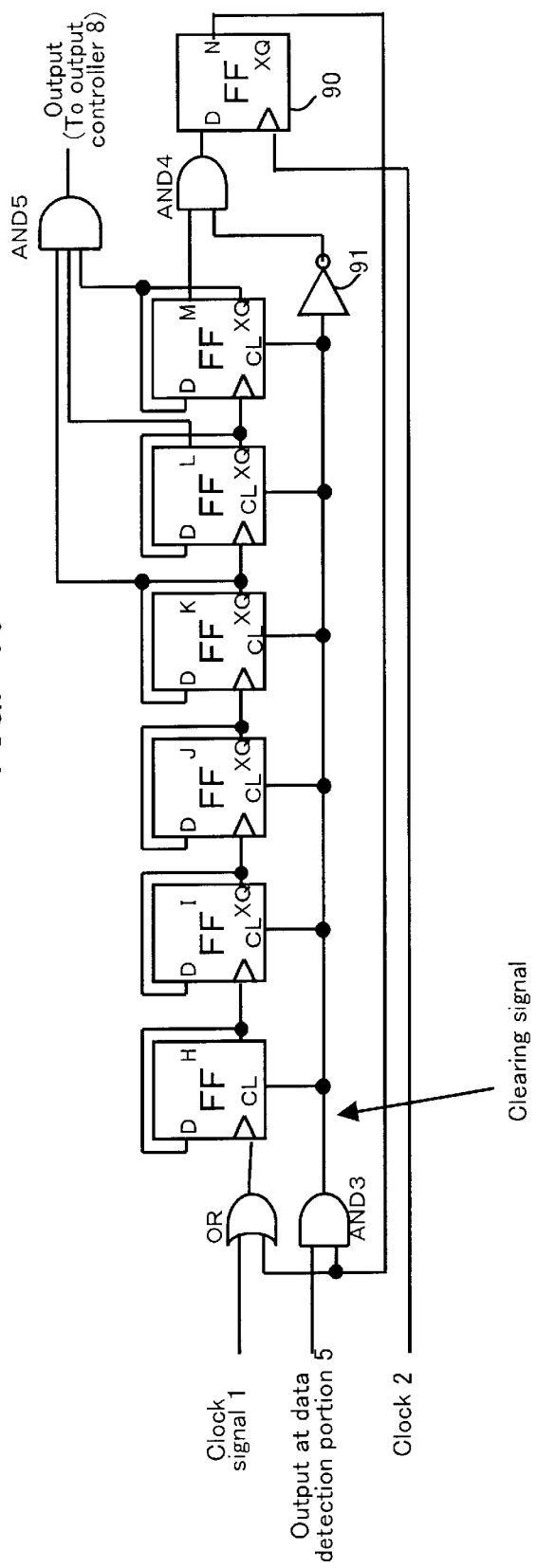
FIG. 19 is still another circuit example of delay portion 10.
Figure 20:
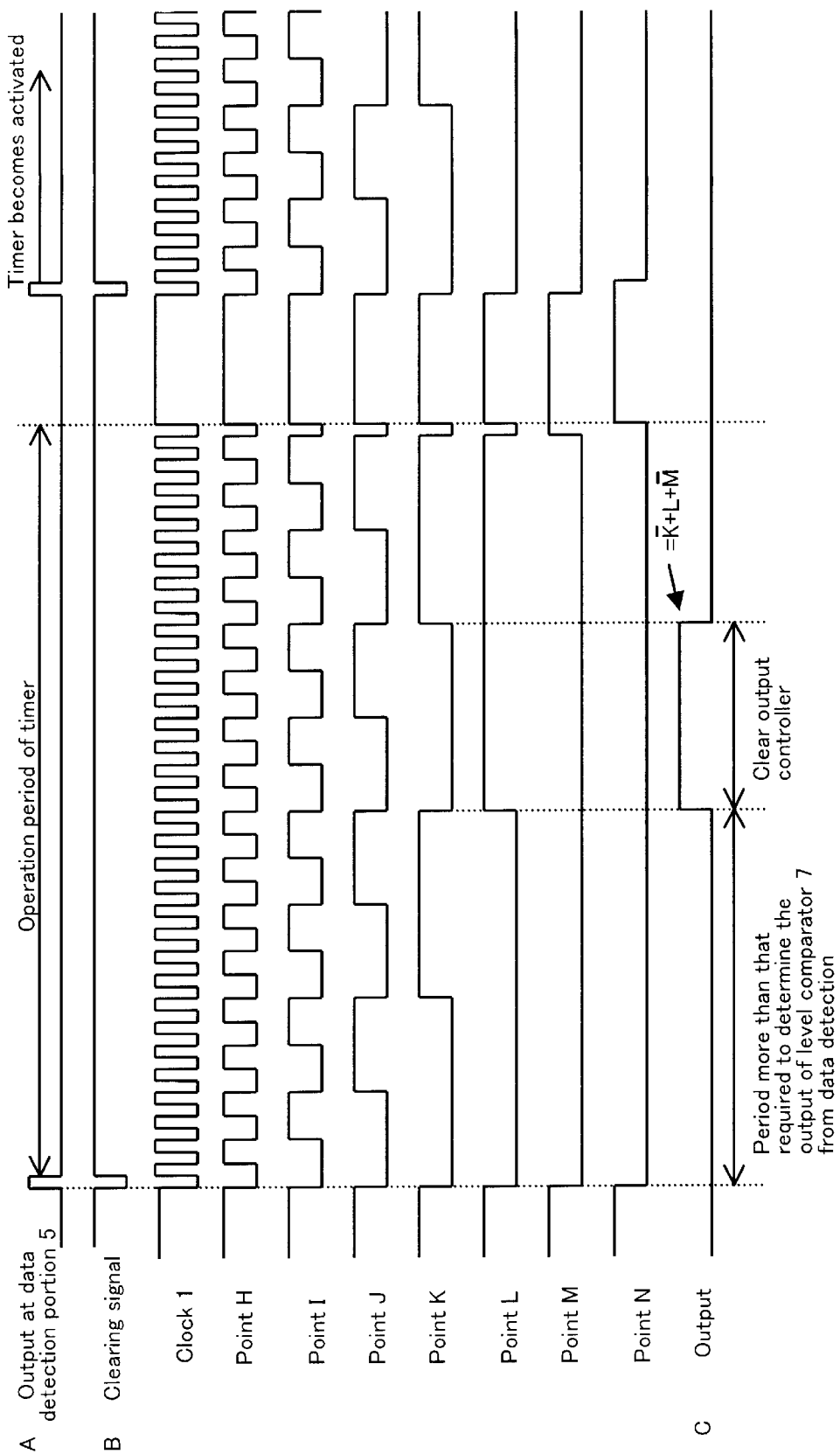
FIG. 20 is an operation time chart of the circuit shown in FIG. 19.

In FIG. 19, there is shown a circuit example of another delay portion 10. An operation time chart thereof is shown in FIG. 20. The circuit provides an asynchronous timer composed of n flip-flops having clearing function. Logical sum of a non-inverted output of an FF circuit 90 and clock 1 is produced by an OR gate, to input into a clock terminal of the first stage of FF circuit of the asynchronous timer.

Then, a logical product of the output signal of data detection portion 5 and the output signal of FF circuit 90 is produced by an AND gate AND3, to input into all clearing terminals of the FF circuit having clearing function. Furthermore, a logical product of an output of an inverter 91 having inverted the output signal of the gate AND3 and an output signal of the asynchronous timer is produced by an AND gate AND4, to input to data terminal of FF circuit 90.

Then logical product of either inverted output or non-inverted output of more than two FF circuits having clearing function is produced by an AND gate AND5, to be inputted to output controller 8.

This circuit may be used as a delay circuit to produce delay onto the output of data detection portion 5 which detects data '1' shown in FIG. 3 and FIG. 5.

An operation of the example circuit shown in FIG. 19 is explained using a time chart shown in FIG. 20. The non-inverted output of the asynchronous timer is 'H' until transmission data '1' is detected. Also, an output A of data detection portion 5 is 'L'. Therefore an output of the AND gate AND3 is 'L', an output of inverter 91 is 'H' and an output of the AND gate AND4 is 'H'.

This produces an output of FF circuit 90 having 'H' and an output of OR gate having 'H'. Because there is no clock input in the asynchronous timer, an output of delay portion 9 maintains the preceding state. At this time, an output C of the AND gate AND5 is 'L', and the output controller 8 maintained the preceding state.

When transmission data '1' is inputted, the output of the AND gate AND3 turns to 'H', to clear all FF circuits constituting the asynchronous timer (shown as B in FIG. 20). This produces 'L' on the non-inverted output of the asynchronous timer, and an output of the AND gate AND4 turns to 'L'. Then the non-inverted output of FF circuit 90 turns to 'L', to produce the removal of cleared condition of FF circuit having clearing function constituting the asynchronous timer. Also, clock signal is outputted to an output of the OR gate. Thus the asynchronous timer becomes activated.

Thereafter, when an output of the asynchronous timer becomes 'H', the delay portion 9 restores the state thereof to the state before transmission data '1' has been inputted, to maintain the current state until the data '1' is inputted thereafter. Even if data '1' is detected while the asynchronous timer is being activated, the data is ignored.

The number of stages of FF circuits having clearing function which constitute the asynchronous timer is predetermined so that an output of the AND gate AND5 becomes 'H' later than that an output of level comparator 7 is determined after the input of transmission data, and the output of the gate AND5 becomes 'L' before the timeout of the asynchronous timer. The above is also applied to predetermine the number of inputs of AND gate AND4. Accordingly, it becomes possible that output phases of both data detection portion 5 and level comparator 7 coincides with each other.

In addition, in the case output controller 8 shown in FIG. 12 is applied, the output time duration generated by output controller 8 corresponding to the output of level comparator 7 becomes constant, irrespective of the time duration of output signal '1' produced by data detection portion 5. Therefore the time of issue, and also the time of restore, of the light output deterioration warning may be clearly defined.

Figure 21:
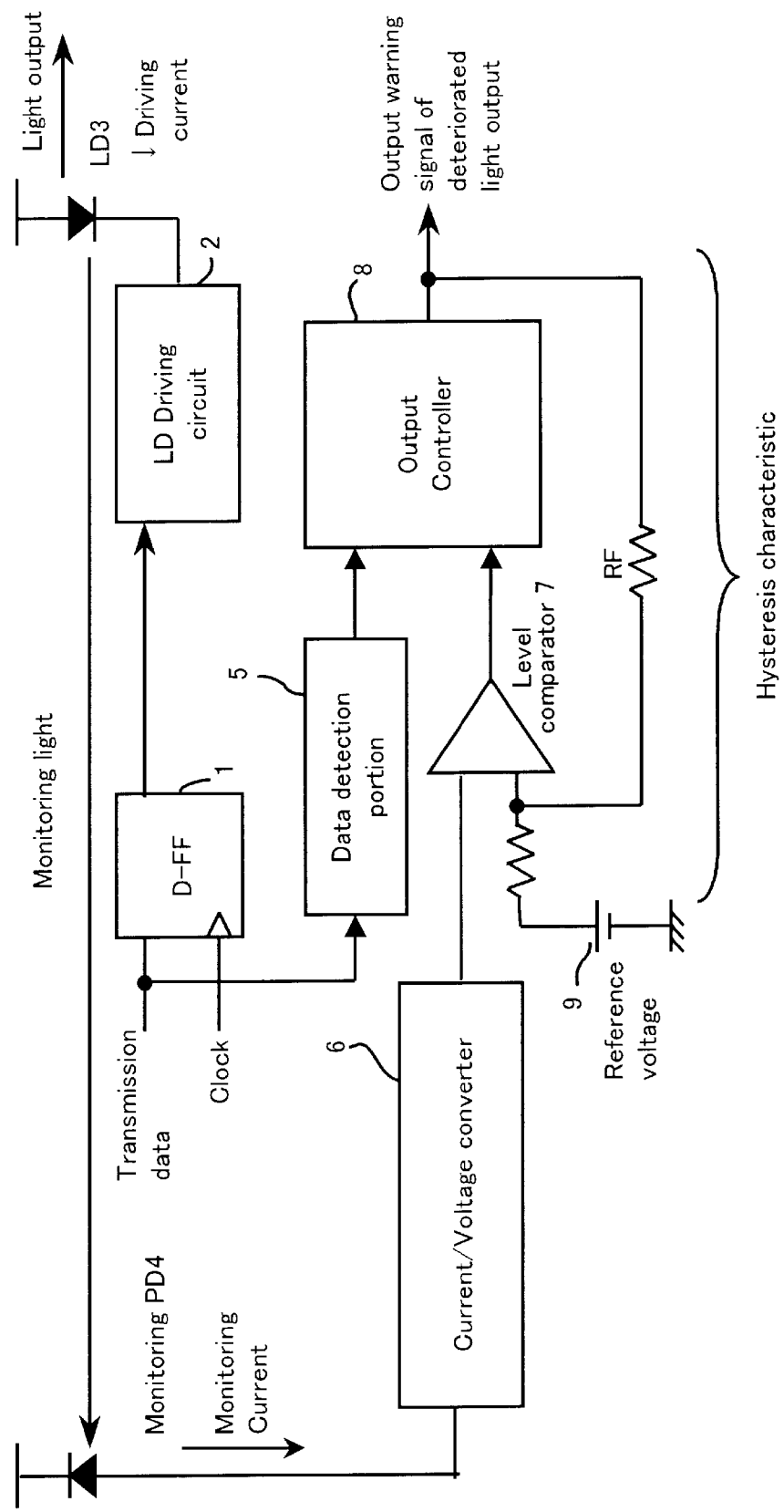
FIG. 21 is a block diagram of the third embodiment of the present invention.

In FIG. 21, there is shown a block diagram of the third embodiment of the present invention. This embodiment has a function to prevent vibration (i.e. unnecessary repetition) in issuing a deterioration warning when the output condition drifts near the threshold level of light output deterioration warning.

Namely, the circuit in the embodiment shown in FIG. 21 provides a hysteresis characteristic applied to the threshold value as a reference signal 9 to be inputted to level comparator 7 illustrated in the first embodiment of the invention. A feedback resistor RF to form a hysteresis circuit is connected between the output of output controller 8 and the input of level comparator 7, which enables to vary a threshold level depending on the deterioration warning condition.

Figure 22:
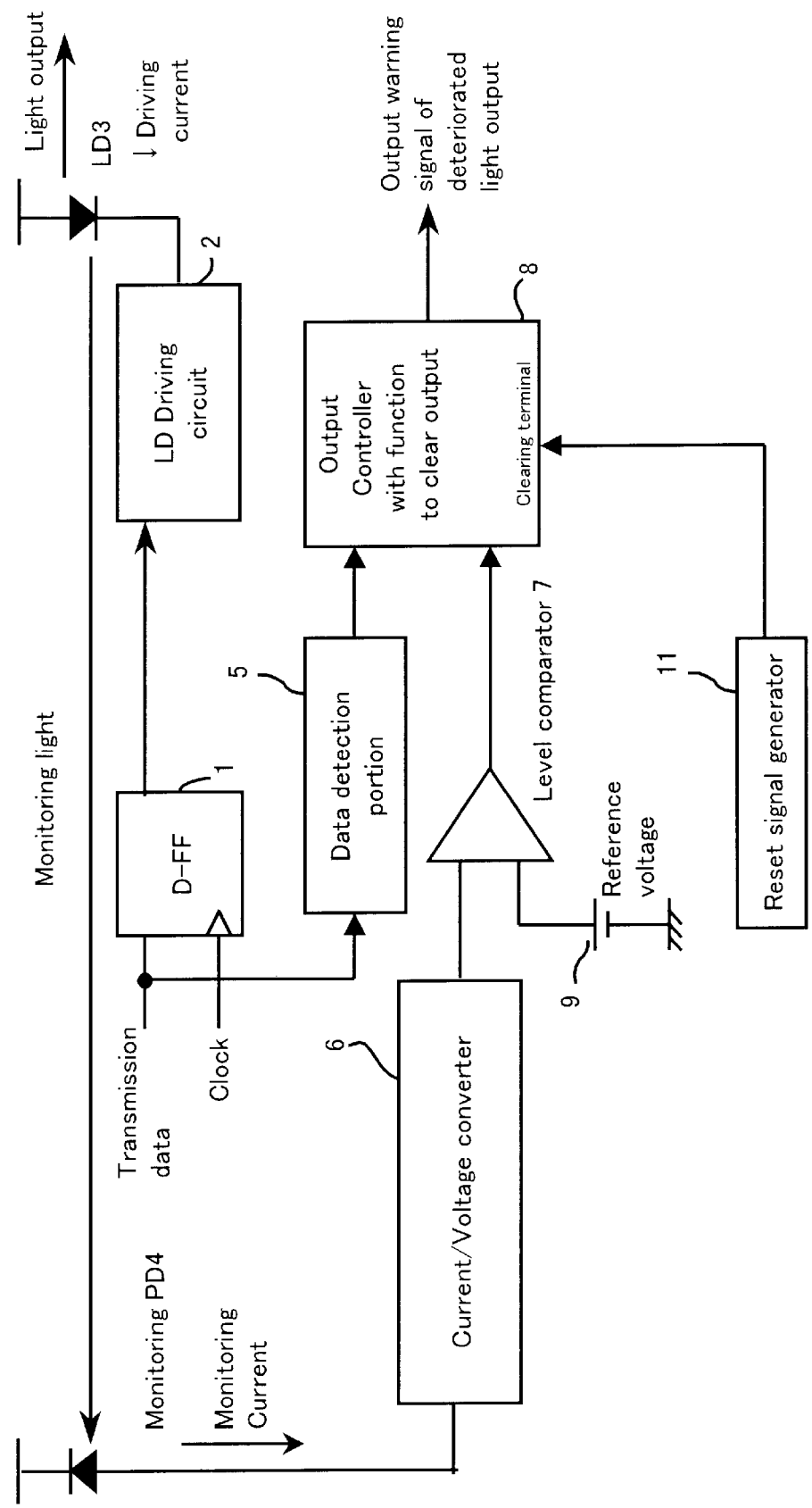
FIG. 22 is a block diagram of the forth embodiment of the present invention.

In FIG. 22, a block diagram of the forth embodiment of the present invention is shown. In this embodiment, a reset signal generator 11 is added to the circuit of the first embodiment to forcibly reset (i.e. turn to 'L') the output signal of output controller 8 (i.e. light deterioration warning output). Also, it is modified that a function to clear output is added to output controller 8.

Figure 23:
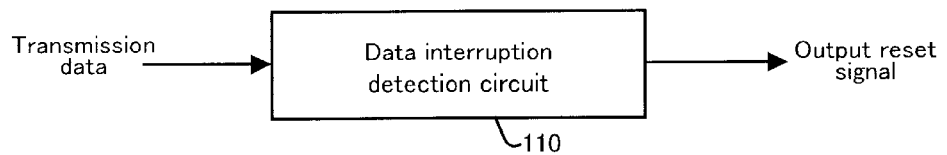
FIG. 23 is a circuit example of a reset signal generator 11 used in the forth embodiment.
Figure 24:
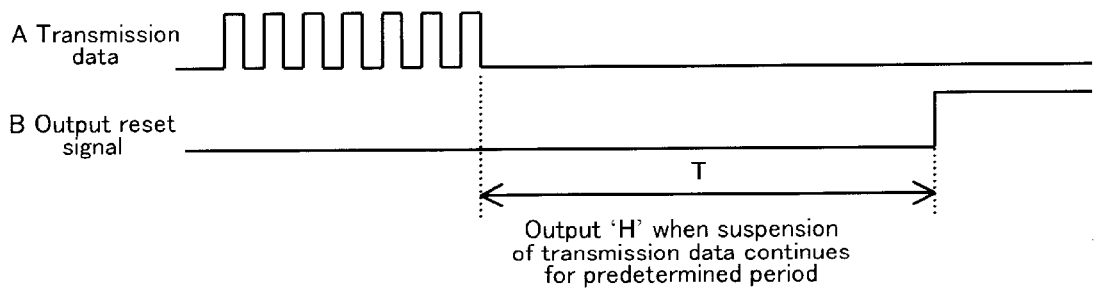
FIG. 24 is an operation of the circuit shown in FIG. 23.

In FIG. 23, there is shown a circuit example of reset signal generator 11 used in the forth embodiment. An operation thereof is shown in FIG. 24. The circuit shown in FIG. 23 includes a data interruption detection circuit 110 to output 'H' as a reset signal B when the suspension of transmission data A continues for a predetermined period T, as shown in FIG. 24.

The output of output controller 8 is forcibly cleared by the reset signal B generated by the above-mentioned circuit to prevent from issuing light deterioration warning during the gap of burst signals. In another circuit example of reset signal generator 11 to be used for the forth embodiment of the present invention, a clock breakdown detection circuit 111 is included to output 'H' as a reset signal B, when the suspension of clock CLK continues for a predetermined period T.

The reset signal B thus generated can forcibly clear the output of output controller 8 so that false generation of light output deterioration warning is prevented also in the case of the interruption of clock signals due to system malfunction.

Figure 27:
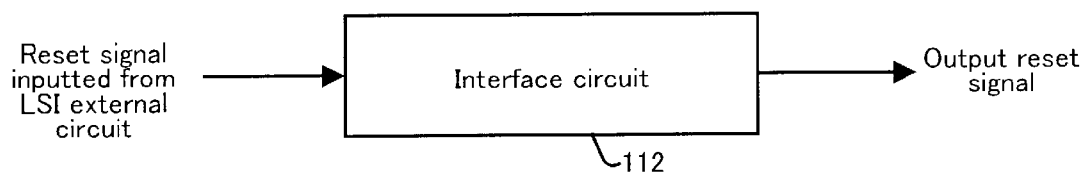
FIG. 27 is still another circuit example of reset signal generator 11 used in the forth embodiment.

In FIG. 27, there is shown another circuit example of reset signal generator 11 used for the forth embodiment of the present invention. The circuit includes a interface circuit 112 to forward a reset signal inputted from an external circuit to output controller 8 incorporated in an LSI.

Figure 28:
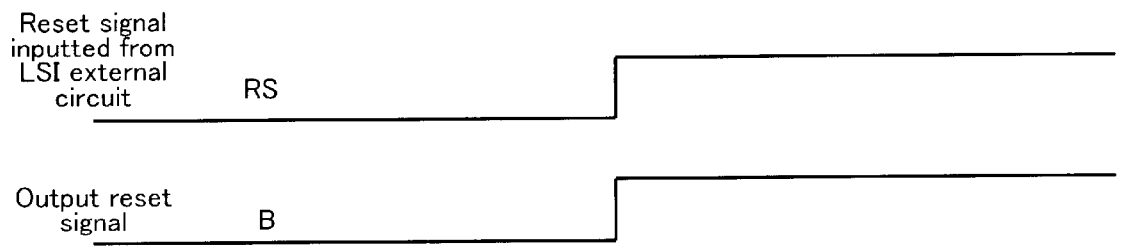
FIG. 28 is an operation of the circuit shown in FIG. 27.

As shown in FIG. 28, a reset signal RS thus generated can forcibly clear the output of output controller 8, to reset light output deterioration warning according to a reset signal inputted from a circuit outside the LSI.

In addition, if desirable, it may also be possible to reset output controller 8 directly by an external reset signal fed from outside the LSI, without using reset signal generator 11.

Figure 25:
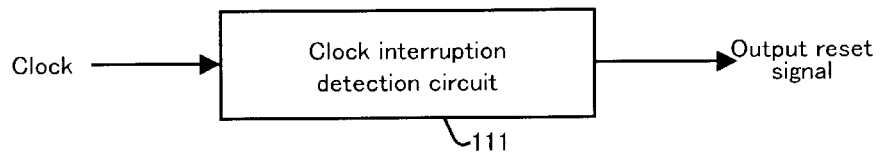
FIG. 25 is another circuit example of reset signal generator 11 used in the forth embodiment.
Figure 26:
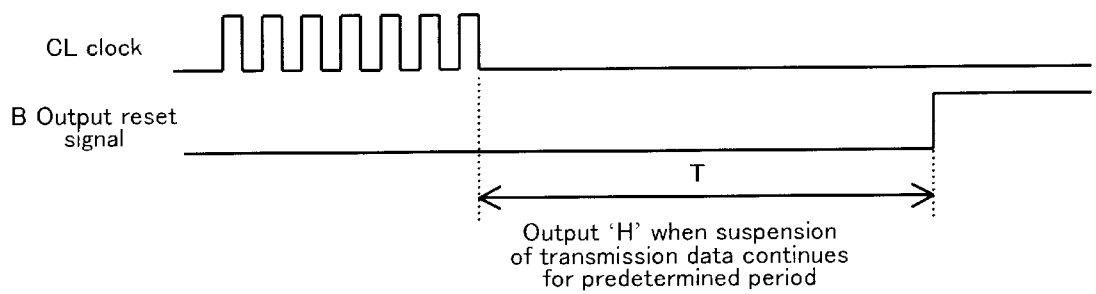
FIG. 26 is an operation of the circuit shown in FIG. 25.
Figure 29:
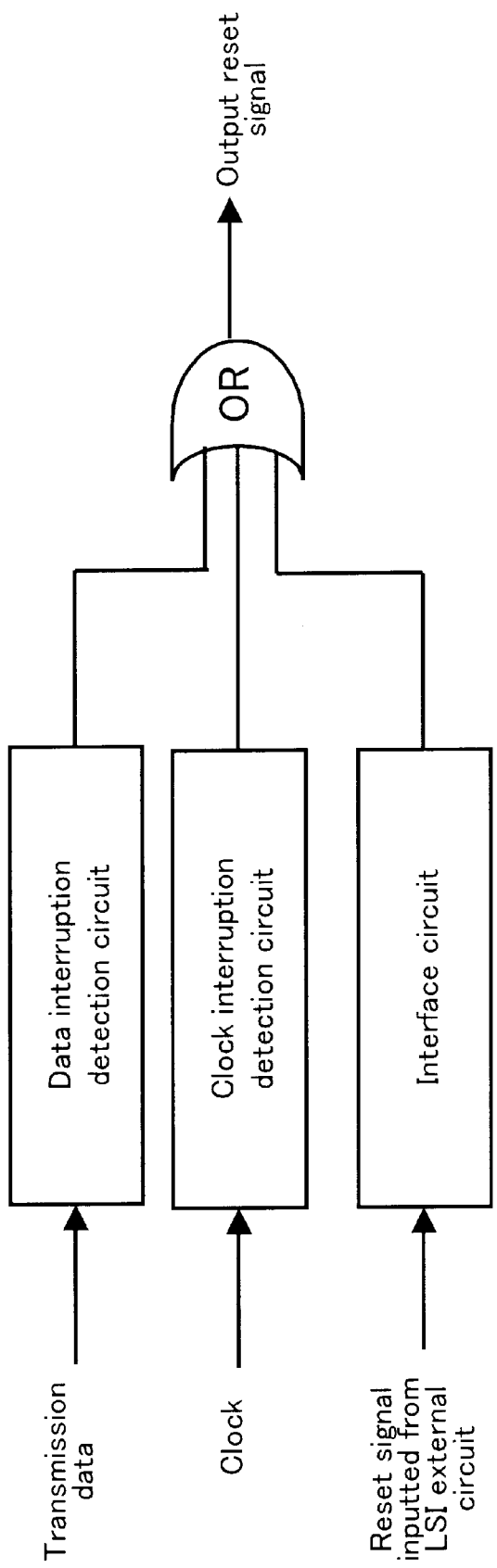
FIG. 29 is a circuit synthesized by OR gate of the circuit examples 110 to 112 of reset signal generator 11 shown in FIG. 23, FIG. 25 and FIG. 27.

FIG. 29 shows a circuit in which circuit examples 110 to 112 of reset signal generator 11 shown in FIG. 23, FIG. 25 and FIG. 27 are combined with an OR gate. Using this combined circuit, output controller 8 can be reset in case of either no transmission data, no clock signals, or external reset signal inputted from outside the LSI.

Figure 30:
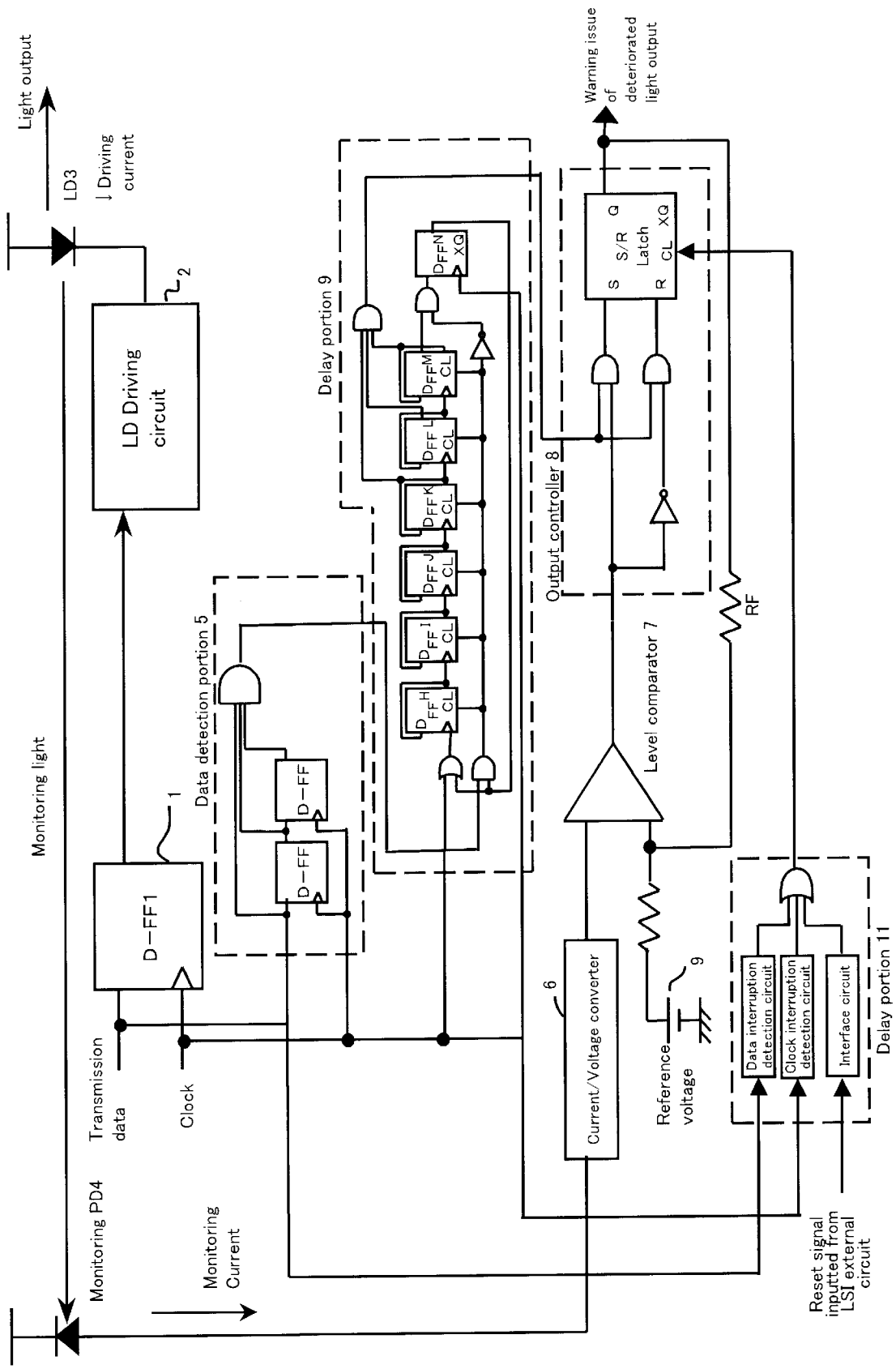
FIG. 30 is a block diagram of the fifth embodiment of the present invention.

In FIG. 30, there is shown the fifth embodiment of the present invention. The circuit shown in FIG. 30 includes the following circuits: a detection circuit of three successive bits of '1' shown in FIG. 5 and FIG. 6 as data detection portion 5; a circuit shown in FIG. 12 and FIG. 13 as output controller 8; and a circuit shown in FIG. 29 as reset signal generator 11.

In addition, a circuit to provide hysteresis characteristic for a threshold value as illustrated in FIG. 21 is included.

Using the above-mentioned circuit, light output deterioration warning can be determined each time the timer shown as delay portion 9 counts time synchronously with data. Thus, the circuit can be applied to a data synchronous type APC. Also, the circuit can be used for both burst transmission system and also continuous transmission system.

Moreover, an unnecessary vibration of issuing a deterioration warning can be avoided because of providing a hysteresis characteristic regarding a threshold value of warning output.

Figure 31:
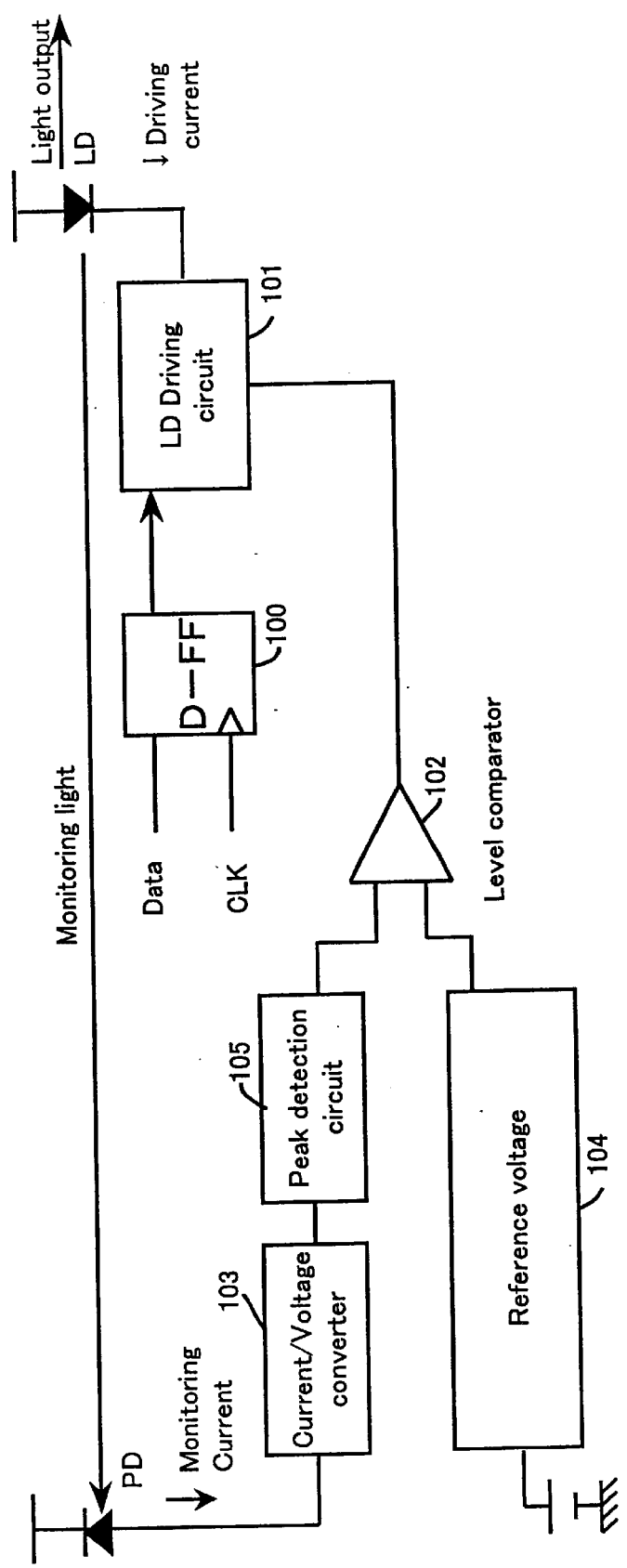
FIG. 31 is the first configuration example of a conventional light output control circuit to drive a light emission element.
Figure 32:
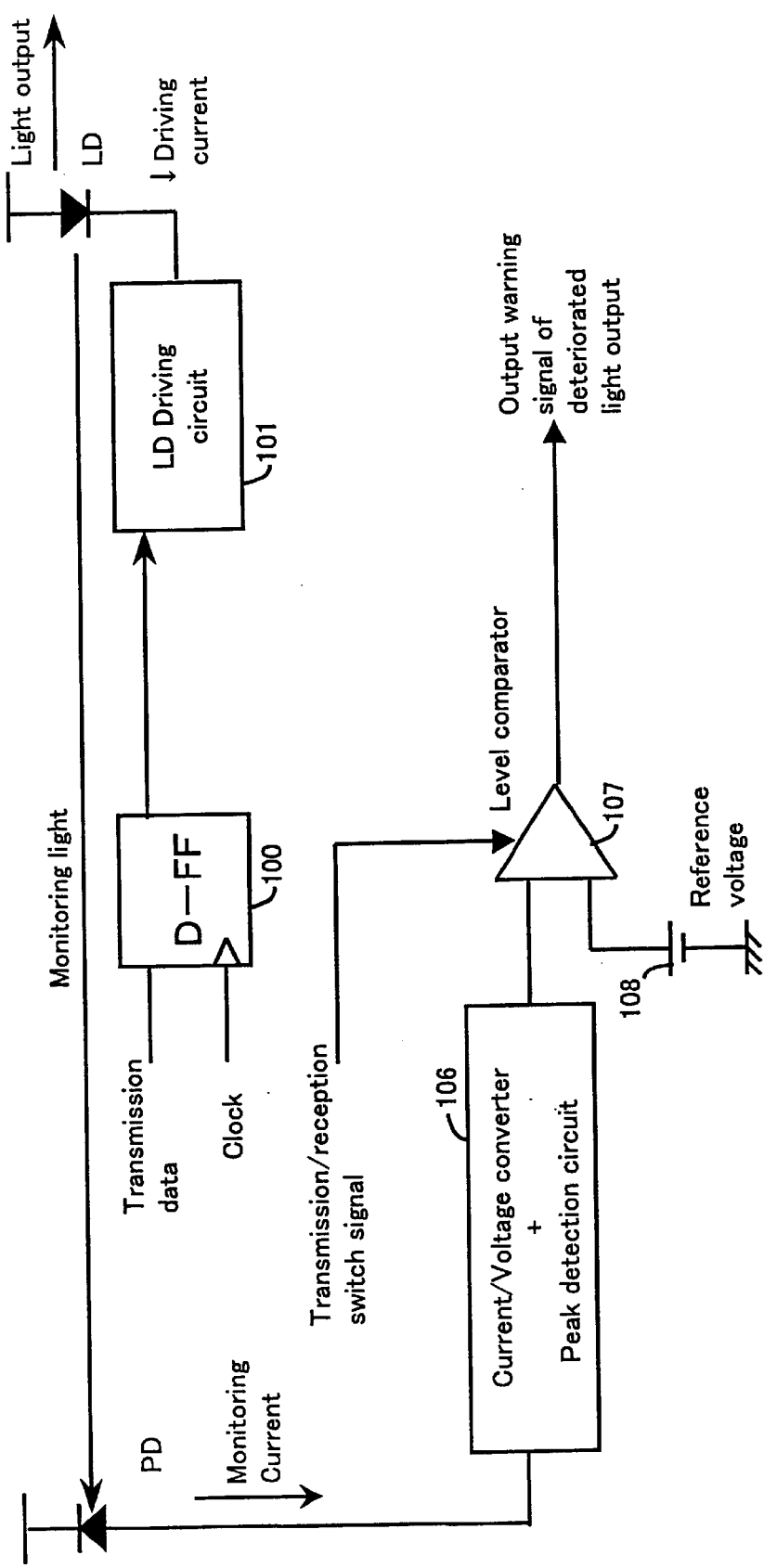
FIG. 32 is a circuit example to output a deteriorated light output warning in the first configuration of the conventional light output control circuit.
Figure 33:
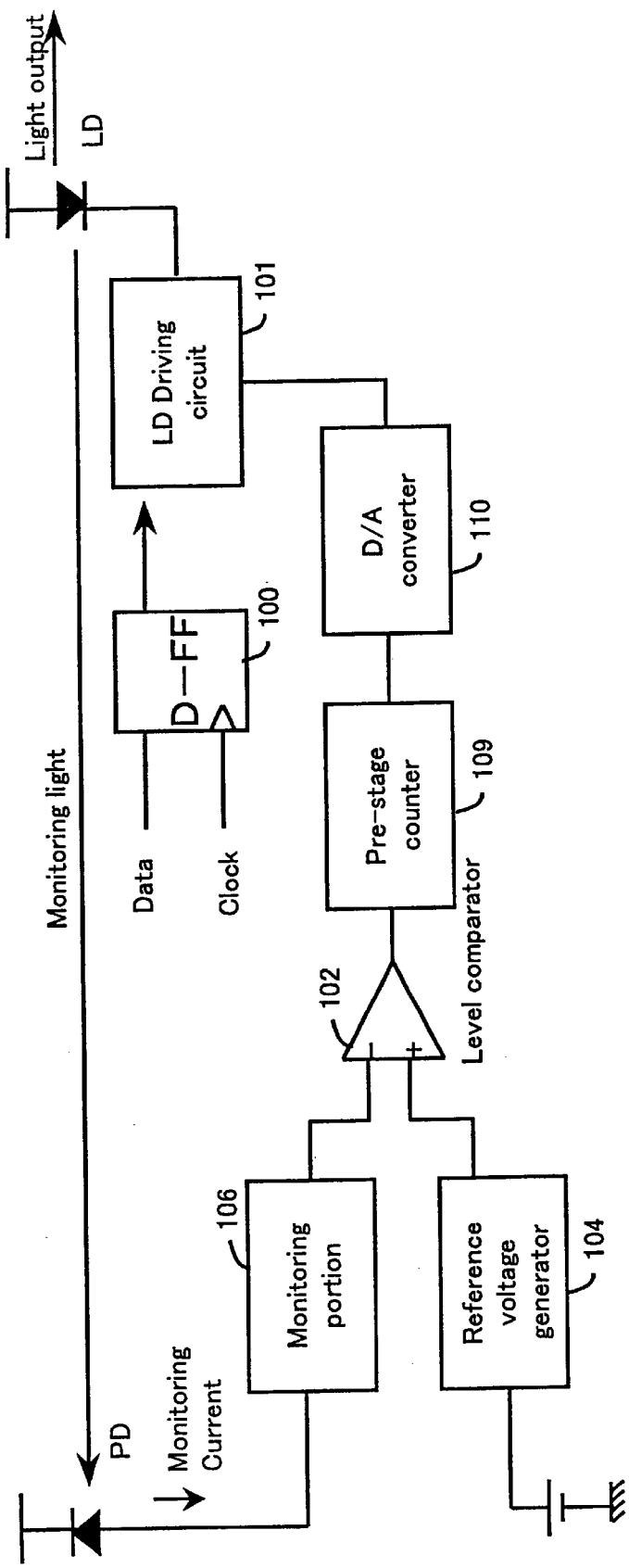
FIG. 33 is the second configuration of the conventional light output control circuit.
Figure 34:
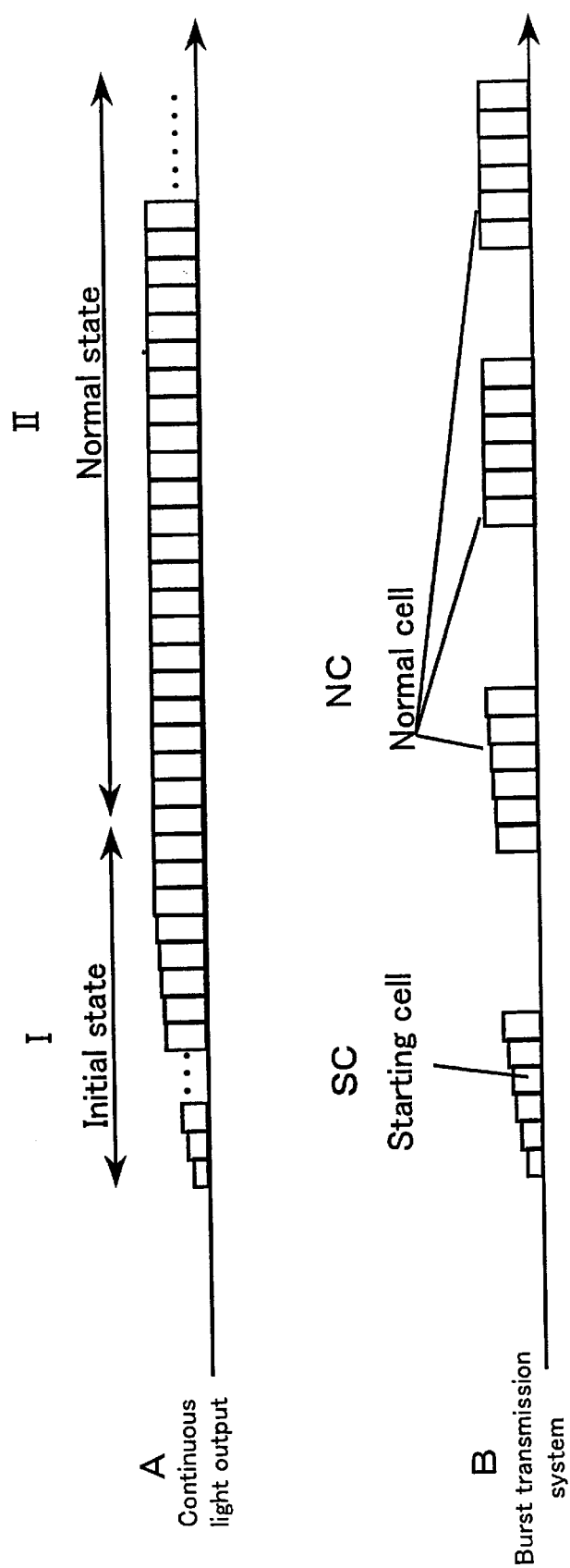
FIG. 34 is a problem in the operation of the conventional light output control circuit shown in FIG. 31 and FIG. 33 when applied in the burst transmission.
Figure 35:
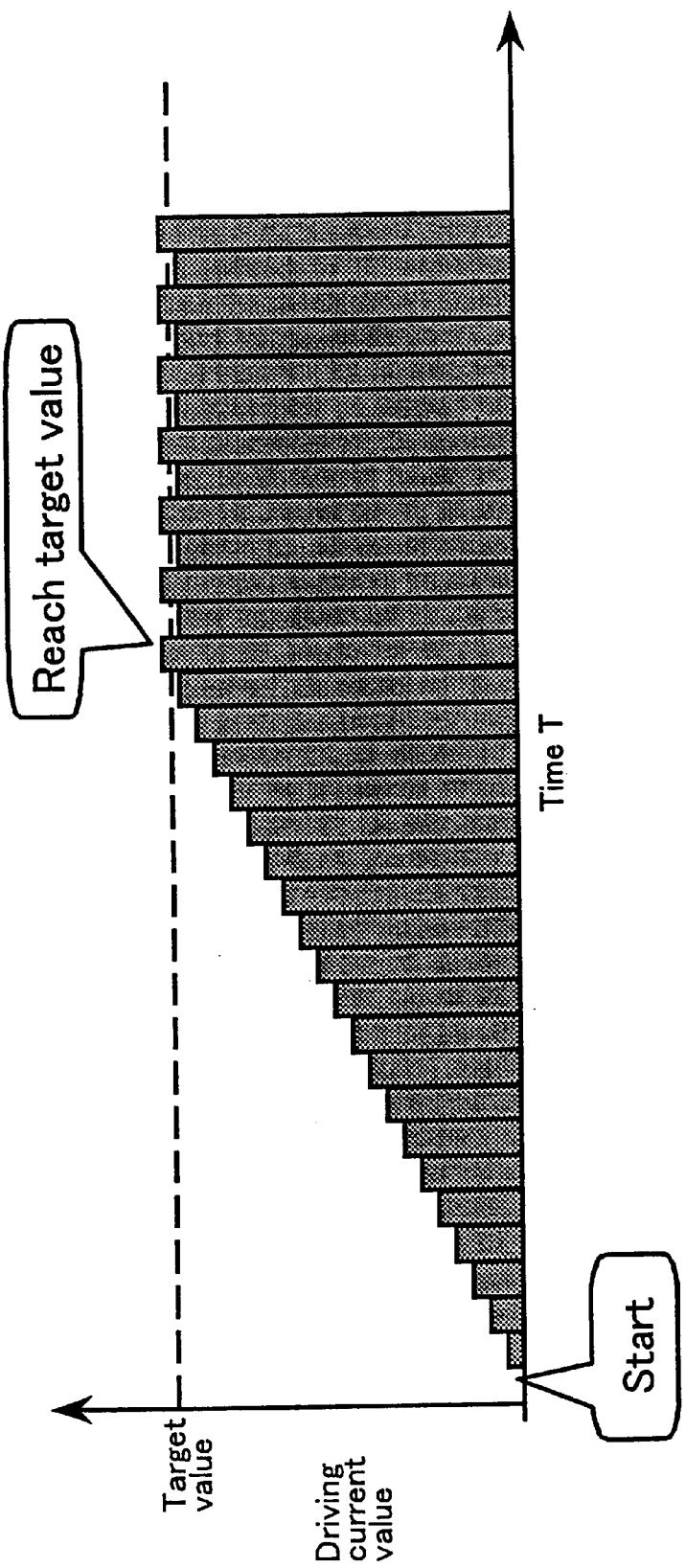
FIG. 35 is the operation characteristic of the second configuration of the light output control circuit shown in FIG. 33.
Figure 36:
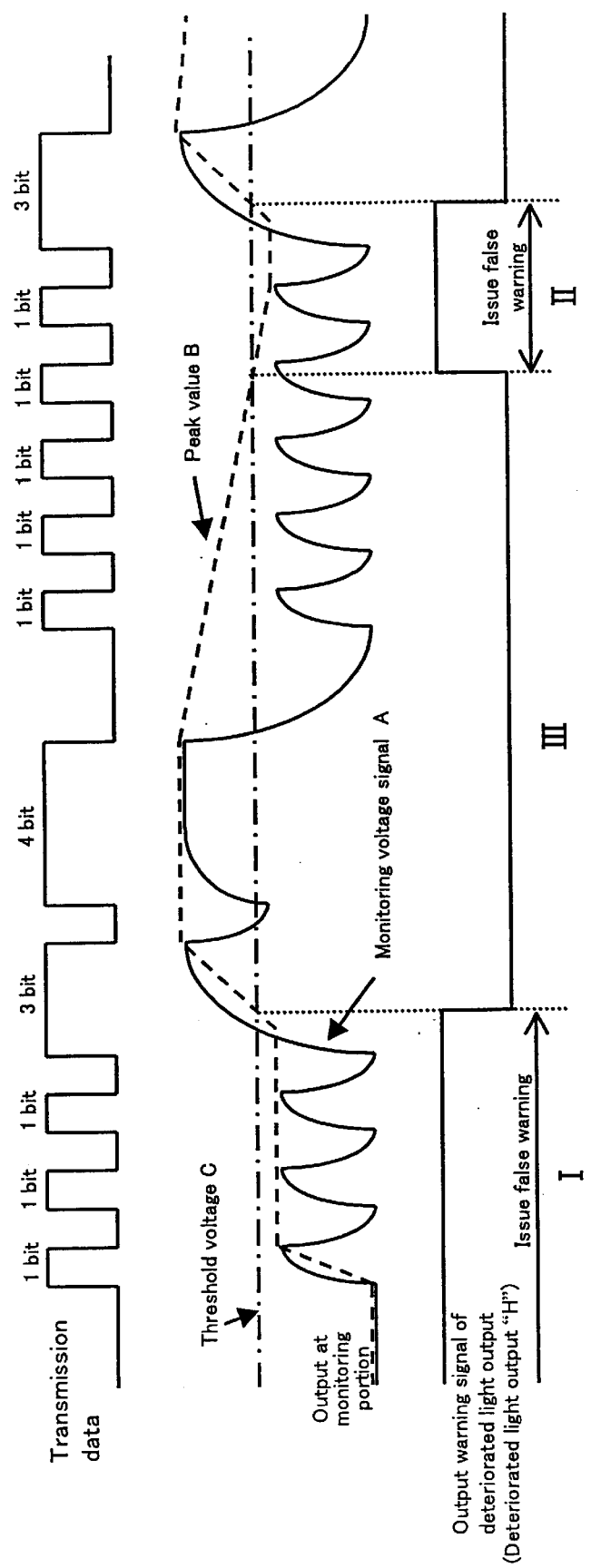
FIG. 36 is a problem of the conventional circuit.

The aforementioned embodiments of the present invention are described based on a light output controlling function having a feedback function as shown in FIG. 31. However, the light output deterioration warning according to the invention may also be applied to, for example, an APC-free optical transmitter which does not have a feedback function.

Namely, the control method of deteriorated light information output according to the present invention may be applied to either an optical transmitter having a data-synchronous type light output control circuit, or an APC-free optical transmitter which does not have light output control with feedback function. The method according to the present invention may be applied to either a burst transmission system or a continuous transmission system.

Although the present invention has been described in detail, it will be apparent that other modifications and variations thereof are possible without departing from the scope of the invention defined in the appended claims.

What is claimed is:

1. A light output control circuit having a warning function of deteriorated light output, comprising:
   a monitoring portion to detect light output emitted from a light emission element which is driven in accordance with transmission data;
   a level comparator to compare a monitoring signal outputted from said monitoring portion with a reference signal;
   a data detection portion to detect an existence of said transmission data; and,
   an output controller to determine whether to issue a light output deterioration warning using an output signal of said data detection portion and an output signal of said level comparator,
   wherein said data detection portion outputs a detection signal of 'transmission data existent' when successive n bits of '1' have been detected in said transmission data.

2. A light output control circuit having a warning function of deteriorated light output according to claim 1, wherein said output controller includes:
   a first AND gate to produce a logical product of an output signal of said data detection portion and an output of said level comparator;
   an inverter to invert the output signal of said level comparator;
   a second AND gate to produce a logical product of the output signal of said data detection portion and the output signal of said inverter; and,
   a latch circuit to receive an output of said first AND gate as a set signal and to receive an output of said second AND gate as a reset signal.

3. A light output control circuit having a warning function of deteriorated light output according to claim 1, wherein a delay portion is provided between said data detection portion and said output controller to adjust an output signal phase of said level comparator to a phase of said transmission data, so that an input timing of the output signal of said level comparator to said output controller may coincide with an input timing of an output signal of said data detection portion to said output controller.

4. A light output control circuit having a warning function of deteriorated light output according to claim 3, wherein said delay portion includes a timer which starts counting triggered by the output signal of said data detection portion.

5. A light output control circuit having a warning function of deteriorated light output according to claim 1, wherein a level of said reference signal inputted to said level comparator is changed with a hysteresis characteristic according to an output state of said output controller.

6. A light output control circuit having a warning function of deteriorated light output according to claim 1, further comprising a reset signal generator to reset an output state of said output controller forcibly by a reset signal.

7. A light output control circuit having a warning function of deteriorated light output according to claim 6, wherein said reset signal is generated either when said transmission data has not been existent for a predetermined period or a clock pulse has been interrupted.

8. A light output control circuit having a warning function of deteriorated light output according to claim 6, wherein said light output control circuit is constituted in an LSI into which said reset signal is externally supplied.

9. A light output control circuit having a warning function of deteriorated light output, comprising:
   a monitoring portion to detect light output emitted from a light emission element which is driven in accordance with transmission data;
   a level comparator to compare a monitoring signal outputted from said monitoring portion with a reference signal;
   a data detection portion to determine an existence of said transmission data; and,
   an output controller to determine whether to issue a light output deterioration warning using an output signal of said data detection portion and an output signal of said level comparator,
   wherein said data detection portion outputs a detection signal of 'no transmission data existent' when successive n bits of '0' have been detected in said transmission data.

10. A light output control circuit having a warning function of deteriorated light output according to claim 9, wherein said output controller includes:
    a first NOR gate to produce an inverted logical sum of an output signal of said data detection portion and an output signal of said level comparator;

an inverter to invert the output signal of said level comparator;

a second NOR gate to produce an inverted logical sum of the output signal of said data detection portion and an output of said inverter; and, a latch circuit to receive an output of said second NOR gate as a set signal and to receive an output of said first NOR gate as a reset signal.

11. A light output control circuit having a warning function of deteriorated light output, comprising:

a monitoring portion to detect light output emitted from a light emission element which is driven in accordance with transmission data;

a level comparator to compare a monitoring signal outputted from said monitoring portion with a reference signal;

a data detection portion to detect an existence of said transmission data; and, an output controller to determine whether to issue a light output deterioration warning using an output signal of said data detection portion and an output signal of said level comparator, wherein said output controller includes:

a delay circuit to produce delay against an output signal of said data detection portion; and a flip-flop to receive an output of said delay circuit as a clock signal and also to receive on a data terminal thereof an output of said level comparator, and wherein when an output of the level comparator becomes logical '1', the flip-flop outputs a logical '1' signal as a deteriorated light output signal at the timing of the clock signal.

12. A light output control circuit having a warning function of deteriorated light output comprising:

a monitoring portion to detect light output emitted from a light emission element which is driven in accordance with transmission data;

a level comparator to compare a monitoring signal outputted from said monitoring portion with a reference signal;

a data detection portion to detect an existence of said transmission data; and, an output controller to determine whether to issue a light output deterioration warning using an output signal of said data detection portion and an output signal of said level comparator, wherein a level of said reference signal inputted to said level comparator is changed with a hysteresis characteristic according to an output state of said output controller.

* * * * *

UNITED STATES PATENT AND TRADEMARK OFFICE
CERTIFICATE OF CORRECTION

PATENT NO.   : 6,728,495 B1
DATED        : April 27, 2004
INVENTOR(S)  : Makoto Miki et al.

It is certified that error appears in the above-identified patent and that said Letters Patent is hereby corrected as shown below:

<u>Title page,</u>
Item [56], References Cited, U.S. PATENT DOCUMENTS, add:
-- 6,597,485     07/2003     Ikeuchi et al. --

Signed and Sealed this

Tenth Day of August, 2004

JON W. DUDAS
*Acting Director of the United States Patent and Trademark Office*